United States Patent
Hashimoto et al.

(10) Patent No.: US 6,883,123 B2
(45) Date of Patent: Apr. 19, 2005

(54) MICROPROCESSOR RUNAWAY MONITORING CONTROL CIRCUIT

(75) Inventors: Kohji Hashimoto, Tokyo (JP); Katsuya Nakamoto, Tokyo (JP); Masahide Fujita, Tokyo (JP); Hiroyuki Mitsueda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 501 days.

(21) Appl. No.: 10/127,484

(22) Filed: Apr. 23, 2002

(65) Prior Publication Data

US 2003/0079163 A1 Apr. 24, 2003

(30) Foreign Application Priority Data

Oct. 24, 2001 (JP) ........................................ 2001-326050

(51) Int. Cl.[7] ................................................. G06F 11/00
(52) U.S. Cl. ............................ 714/55; 714/23; 714/41; 714/51
(58) Field of Search .............................. 714/23, 41, 51, 714/55

(56) References Cited

U.S. PATENT DOCUMENTS

| | | | | |
|---|---|---|---|---|
| 4,956,842 A | * | 9/1990 | Said .......................... | 714/815 |
| 5,594,685 A | * | 1/1997 | Bergemont et al. .... | 365/185.03 |
| 5,809,229 A | * | 9/1998 | Mori .......................... | 714/55 |
| 6,498,403 B1 | * | 12/2002 | Hagidaira et al. ........... | 307/9.1 |
| 6,526,527 B1 | * | 2/2003 | Gall et al. .................... | 714/55 |

FOREIGN PATENT DOCUMENTS

| | | |
|---|---|---|
| JP | 1-298446 | 12/1989 |
| JP | 5-66812 A | 3/1993 |
| JP | 5-81222 | 4/1993 |
| JP | 5-216711 | 8/1993 |
| JP | 6-149604 | 5/1994 |
| JP | 10-222402 | 8/1998 |
| JP | 10-307601 | 11/1998 |
| JP | 11-294252 A | 10/1999 |
| JP | 2000-104622 | 4/2000 |
| JP | 2001-14001 A | 1/2001 |

* cited by examiner

Primary Examiner—Robert Beausoliel
Assistant Examiner—Emerson Puente
(74) Attorney, Agent, or Firm—Sughrue Mion, PLLC

(57) ABSTRACT

A microprocessor runaway monitoring control circuit with which self-diagnosis of a watchdog timer WDT can be carried out safely and cheaply even during operation of the microprocessor (CPU). A microprocessor 101 supplies first and second watchdog clearing signals WD1 and WD2 to first and second watchdog timers WDT1 and WDT2, and when the both of the watchdog clearing signals WD1 and WD2 stop, the microprocessor 101 is reset by way of a logical connector circuit 122. The microprocessor 101 has failure diagnosing means 103 which intentionally stops the first watchdog clearing signal WD1 and diagnoses the response of the first watchdog timer WDT1 on the basis of a monitor signal MN1 and stops the second watchdog clearing signal WD2 and diagnoses the response of the second watchdog timer WDT2 on the basis of a monitor signal MN2, whereby diagnosis of the watchdog timers WDT1, WDT2 is carried out without the microprocessor 101 being stopped.

44 Claims, 13 Drawing Sheets

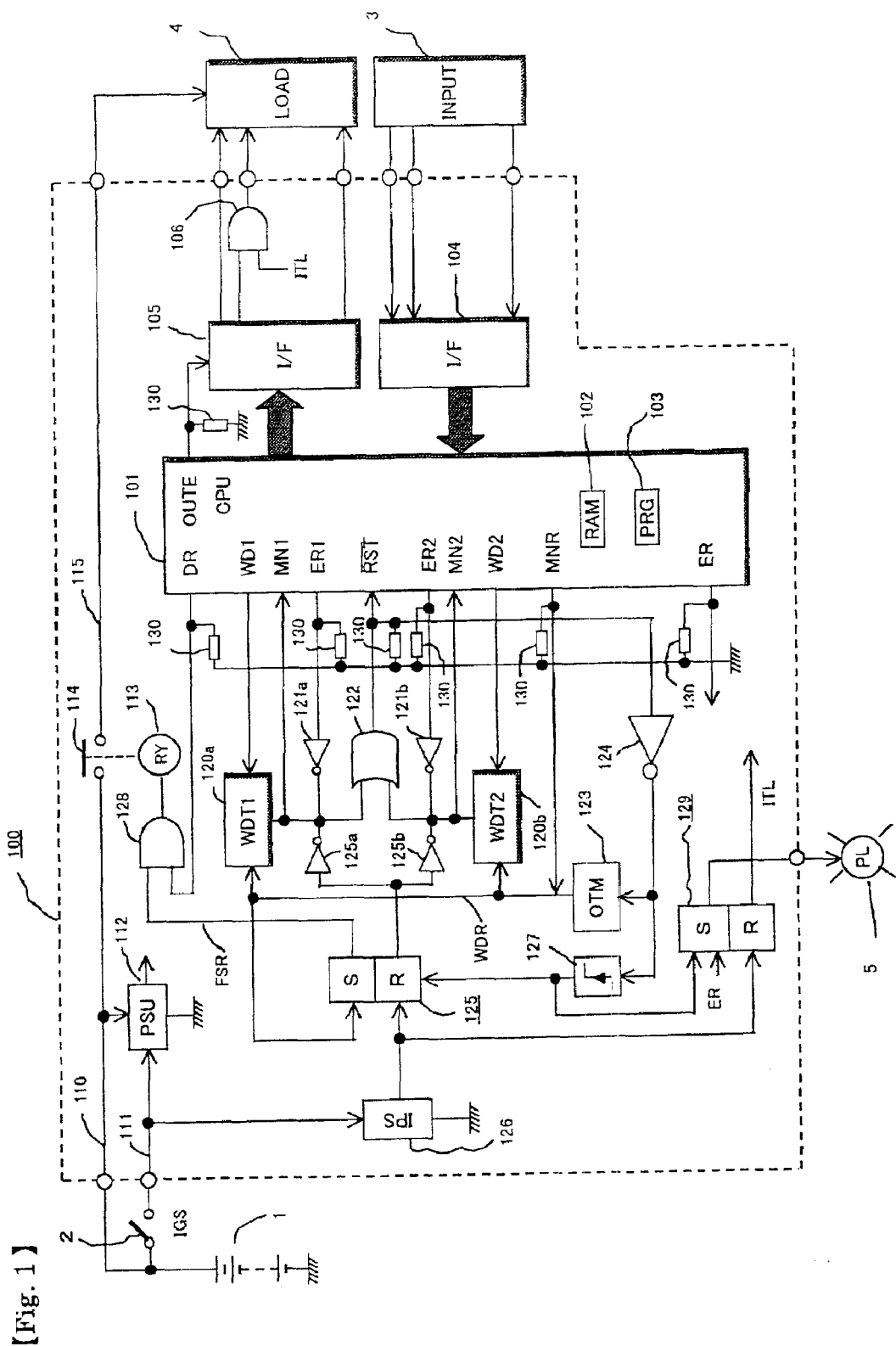
[Fig. 1]

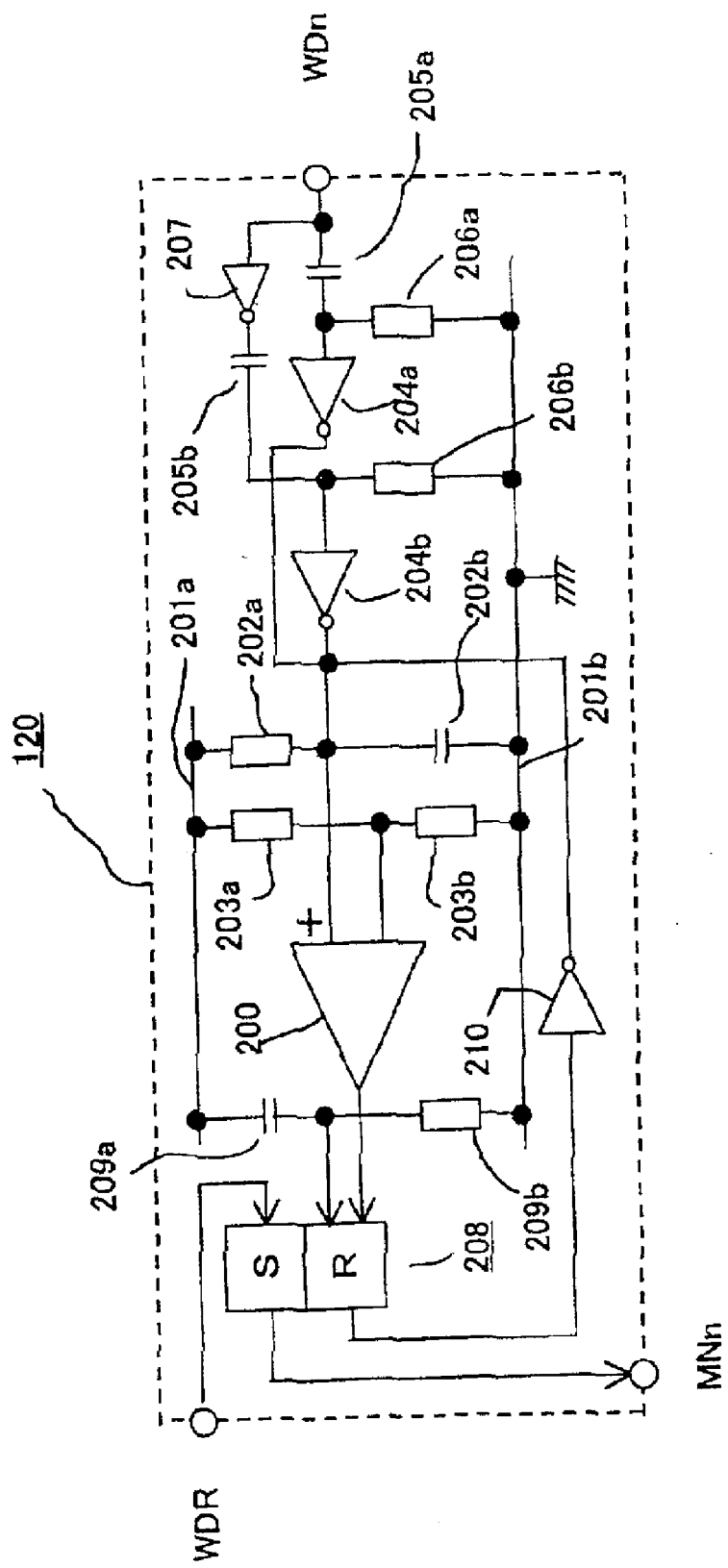
[Fig. 2]

[Fig. 3]

(a) power supply switch 2 — IGS (b) power supply rise pulse 126 — IPS (c) reset completion memory device 125 "set" output — FSR (d) reset signal (monitor signal) — MN1

(e) reset signal (monitor signal) — MN2

(f) effective resetting signal output — $\overline{RST}$ (g) rise pulse 127 — PLS (h) one-shot timer 123 output — WDR (i) watchdog timer clearing signal — WD1

(j) watchdog timer clearing signal — WD2

(k) monitor reset signal output — MNR (l) abnormality occurrence memory device 1 "reset" output — ITL (m) control output — DR (n) output-permitting signal output — OUTE

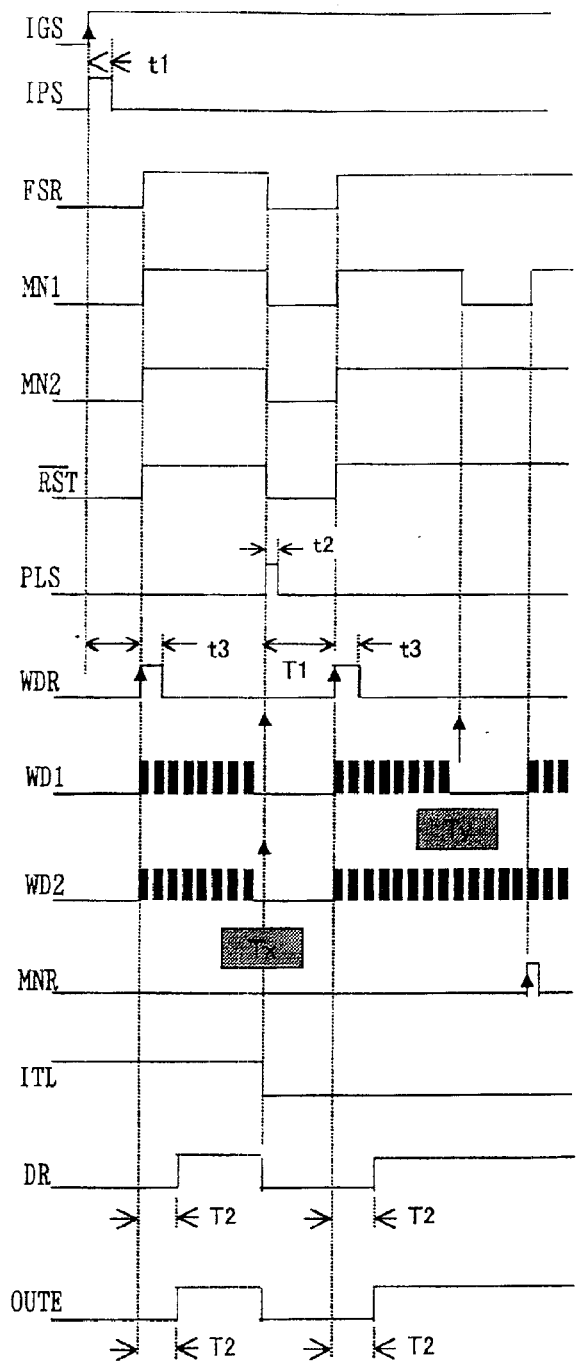

[Fig. 4]
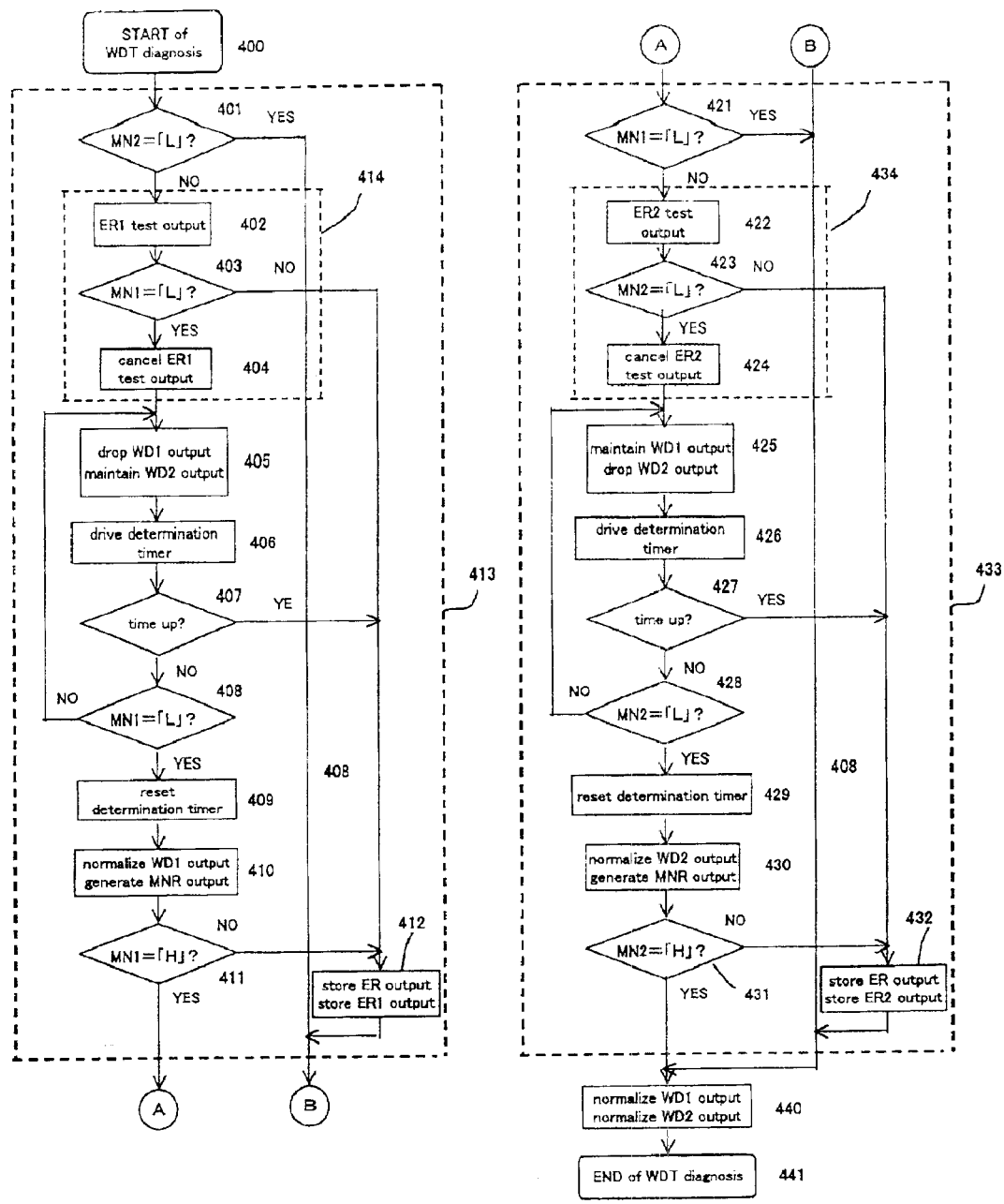

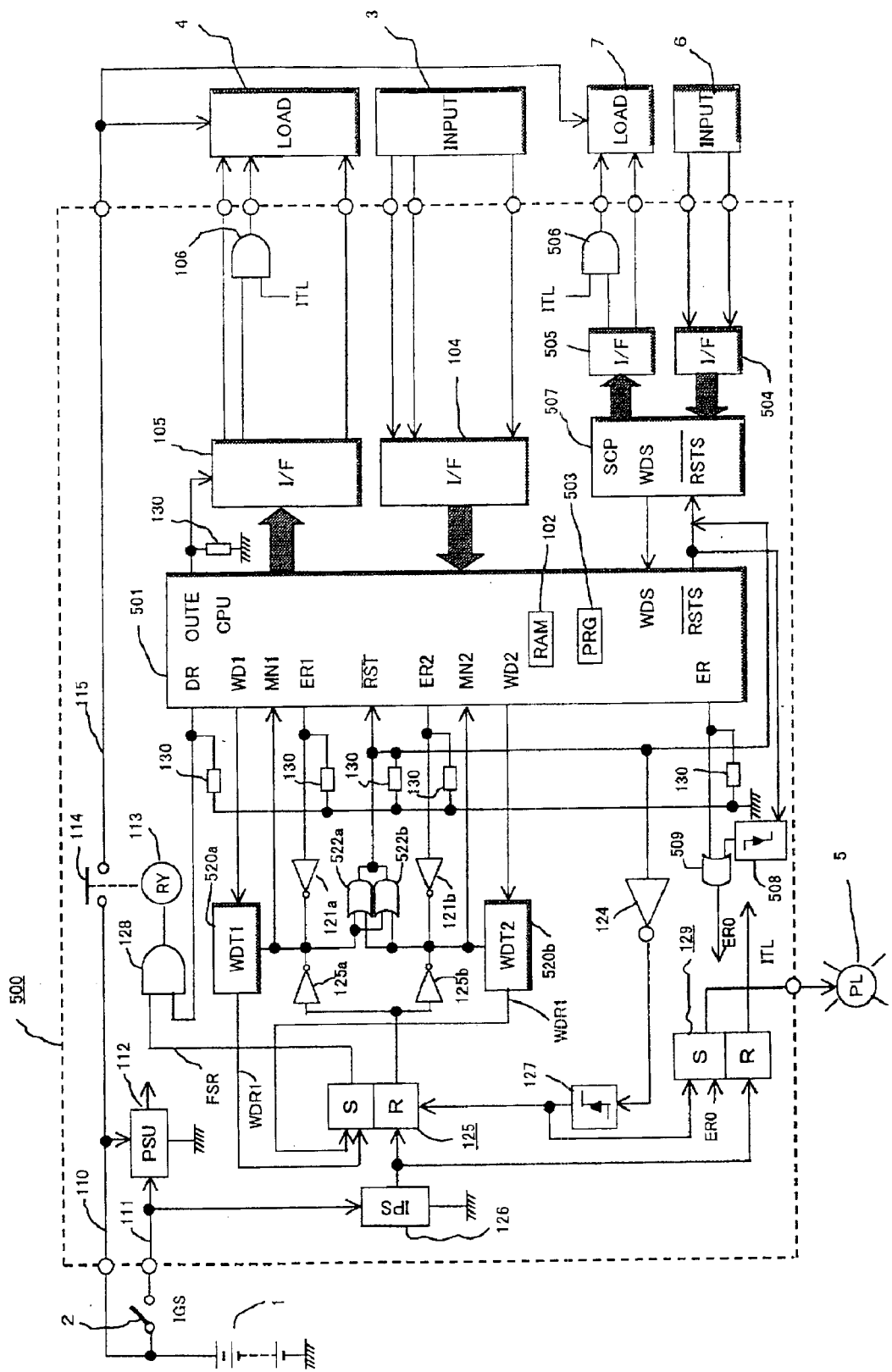
[Fig. 5]

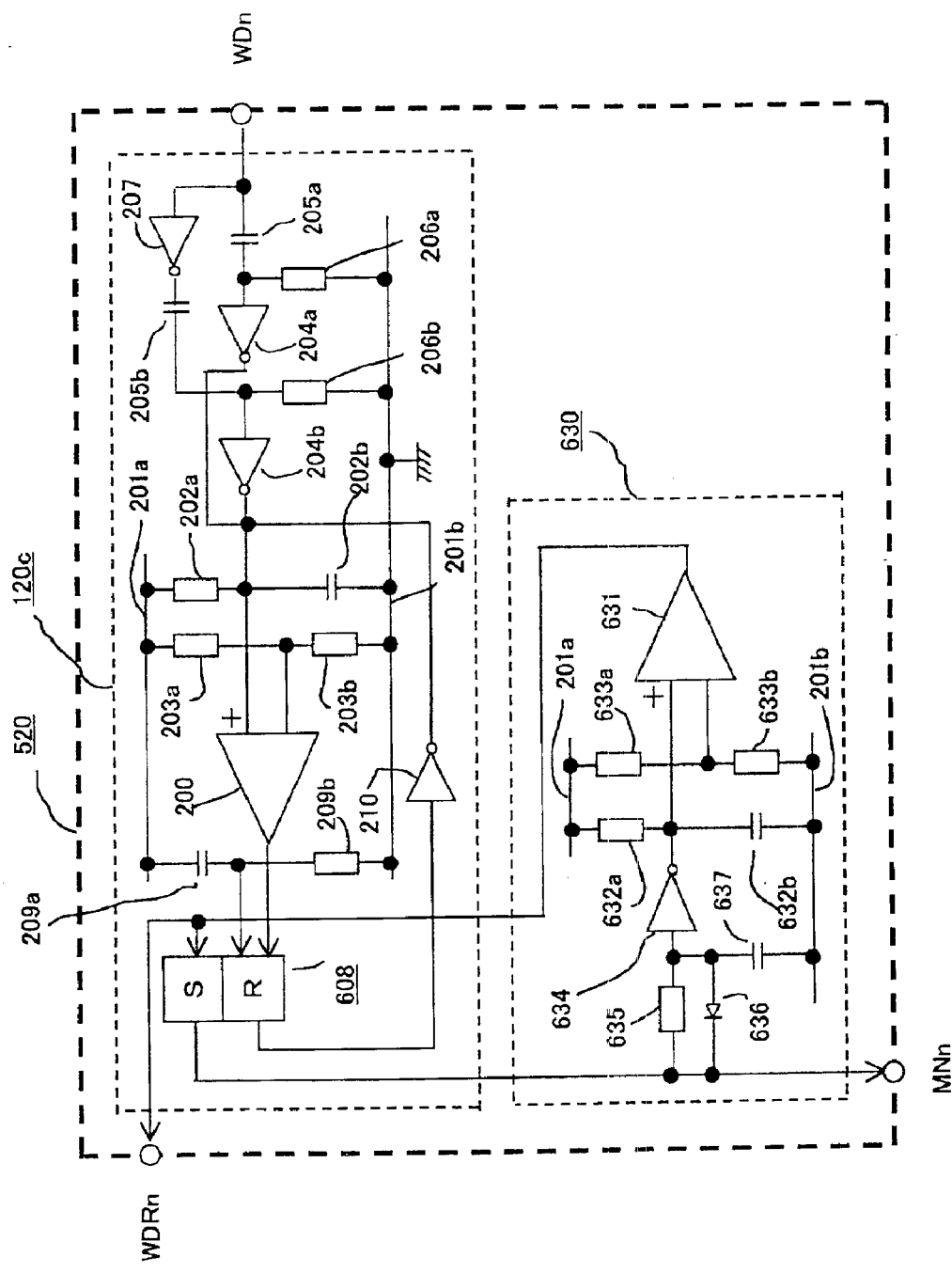
[Fig. 6]

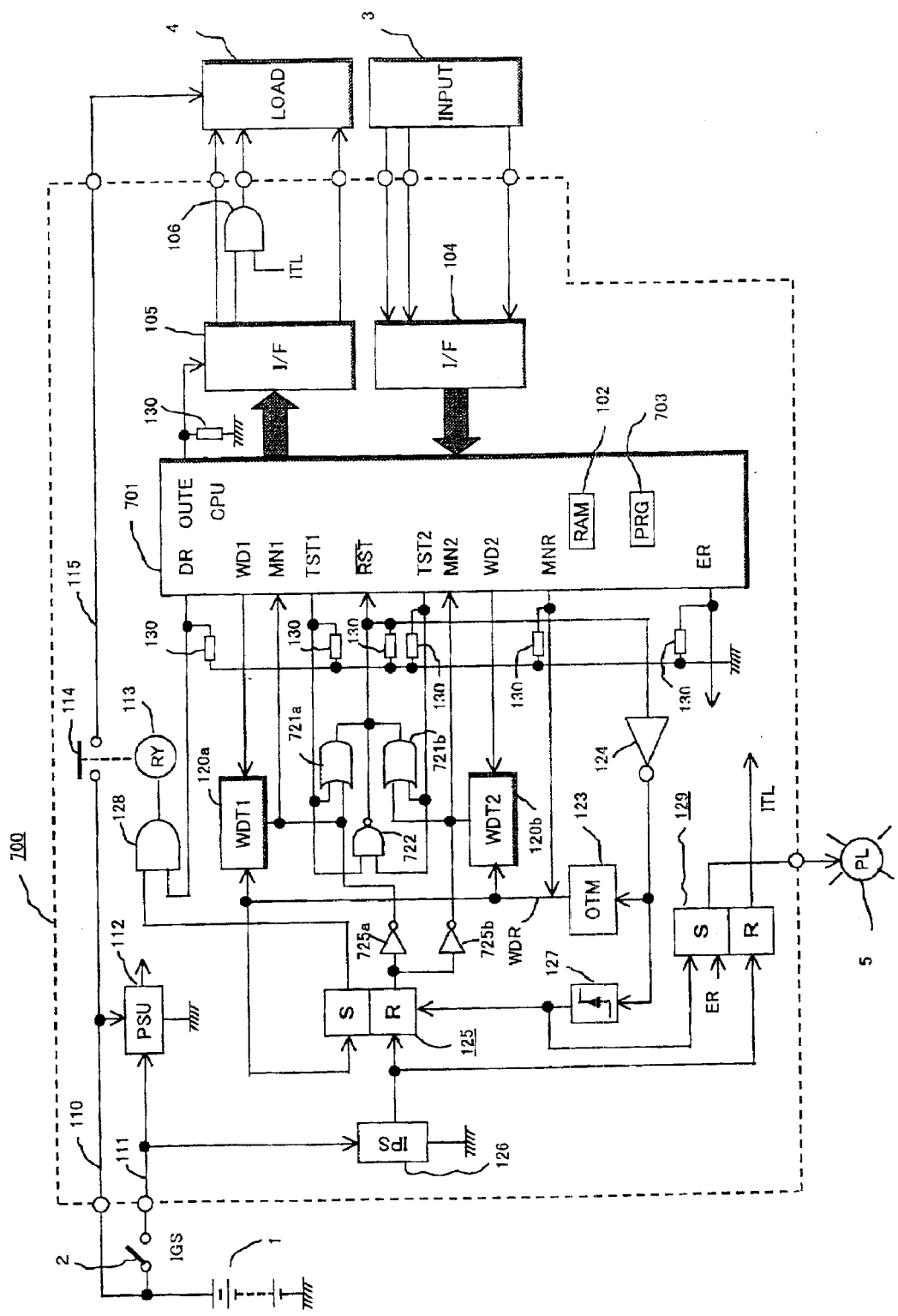
[Fig. 7]

[Fig. 8]
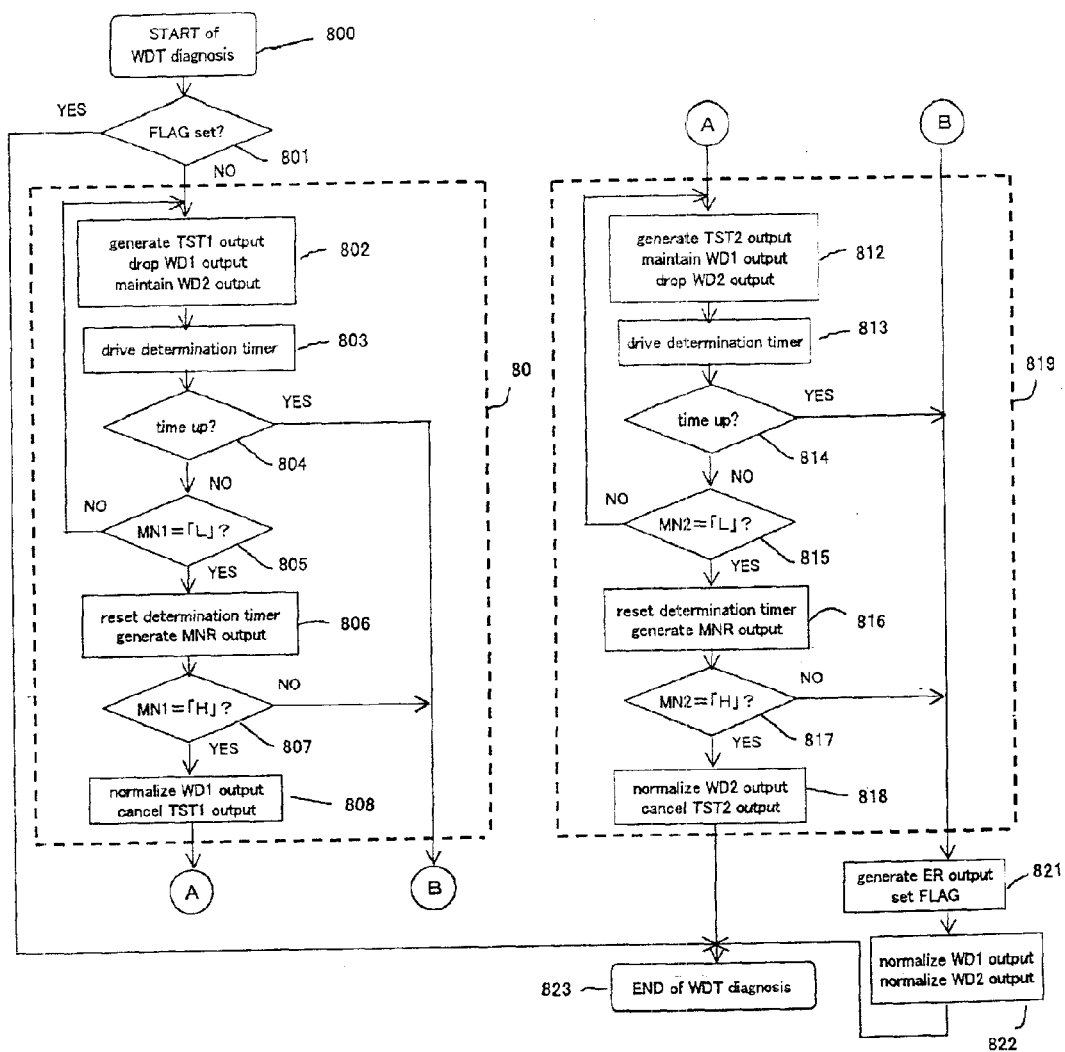

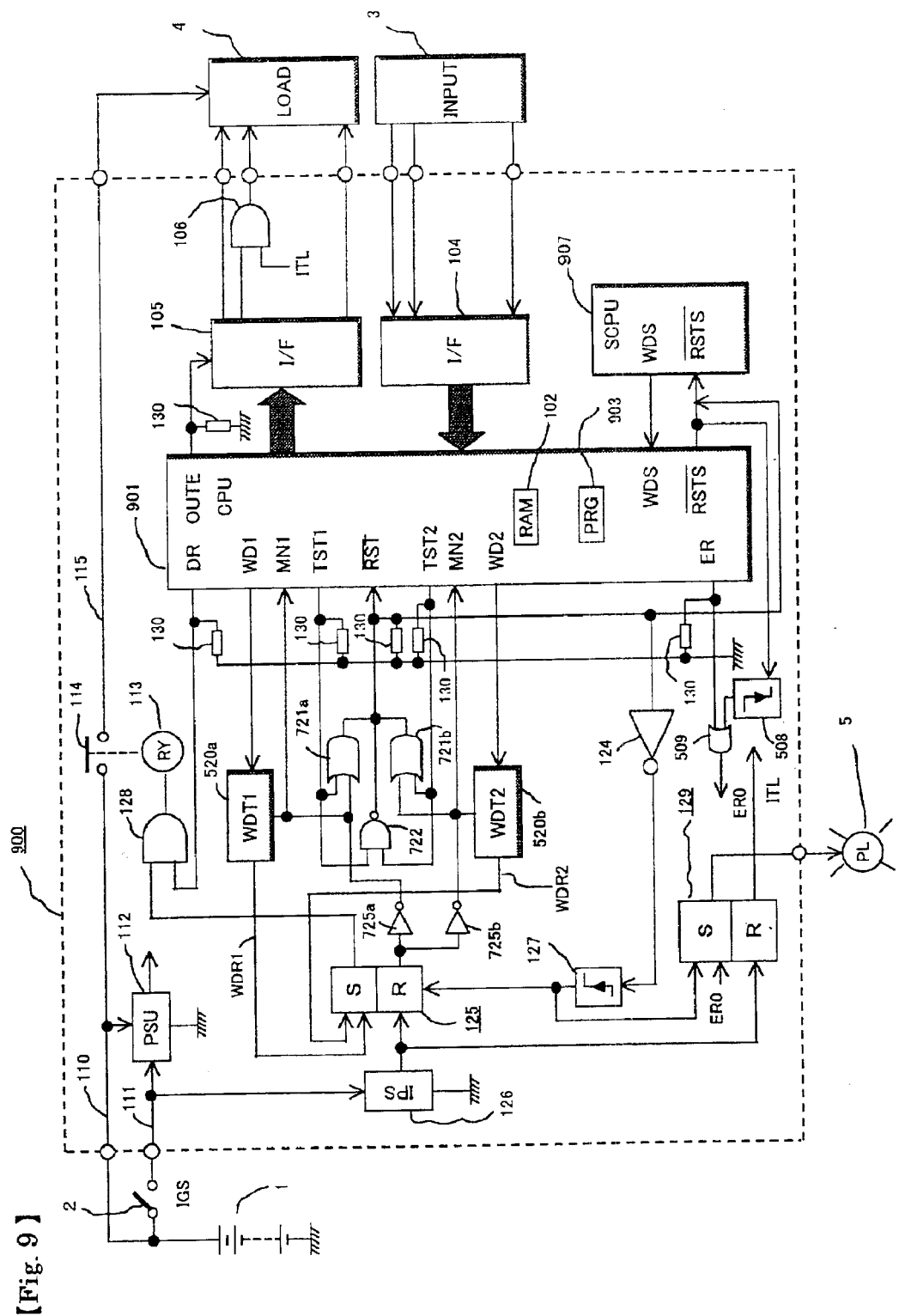
[Fig. 9]

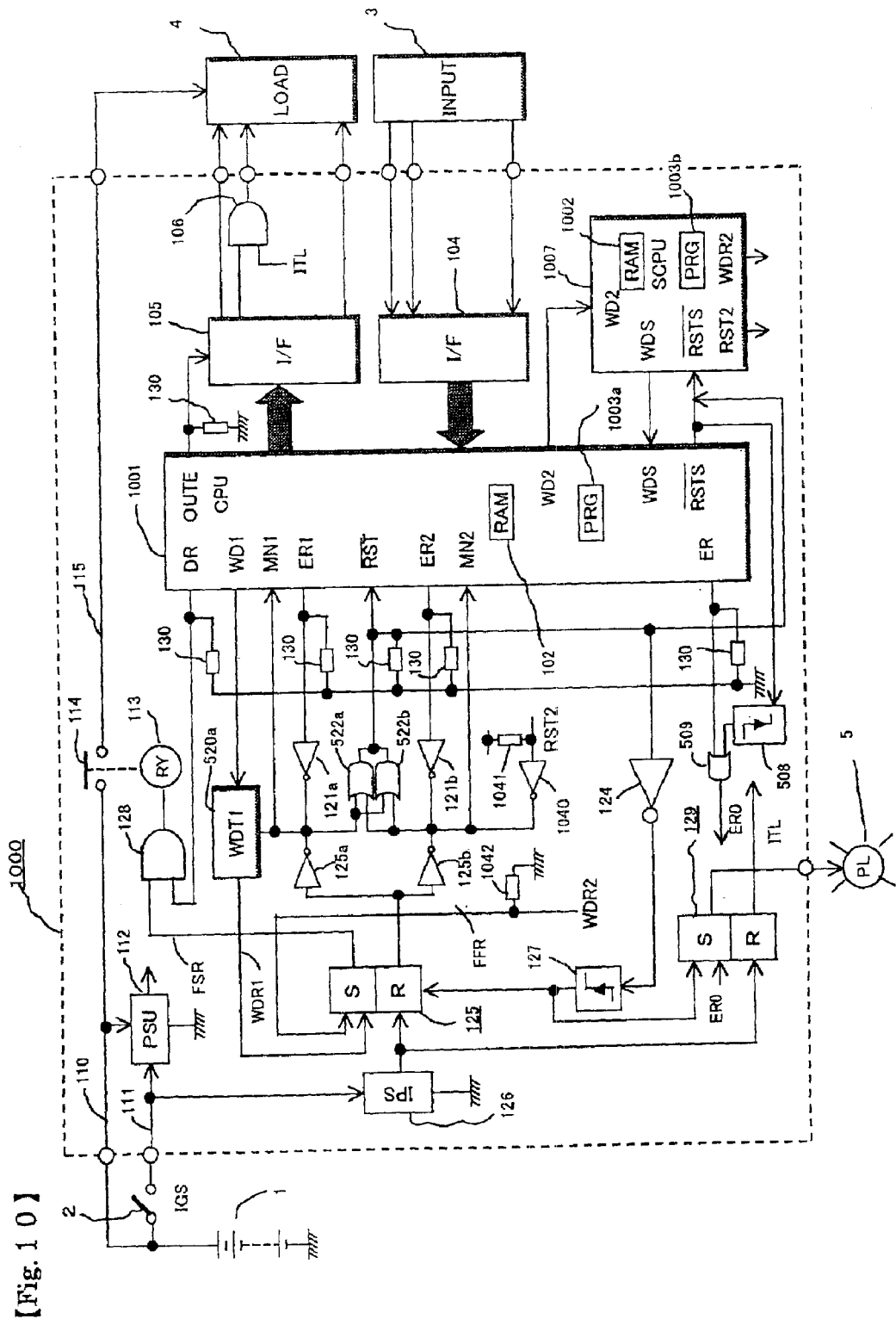

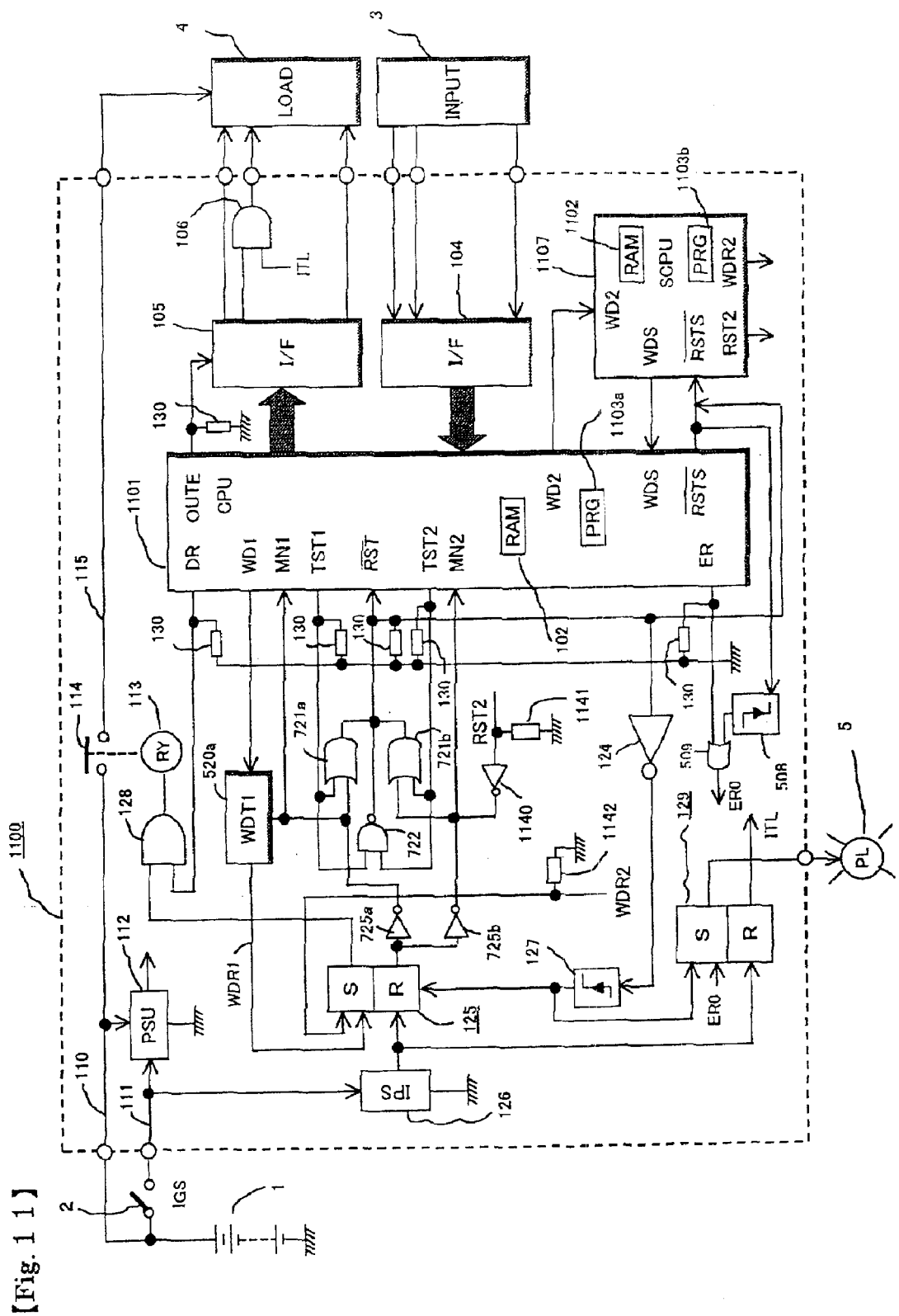
[Fig. 11]

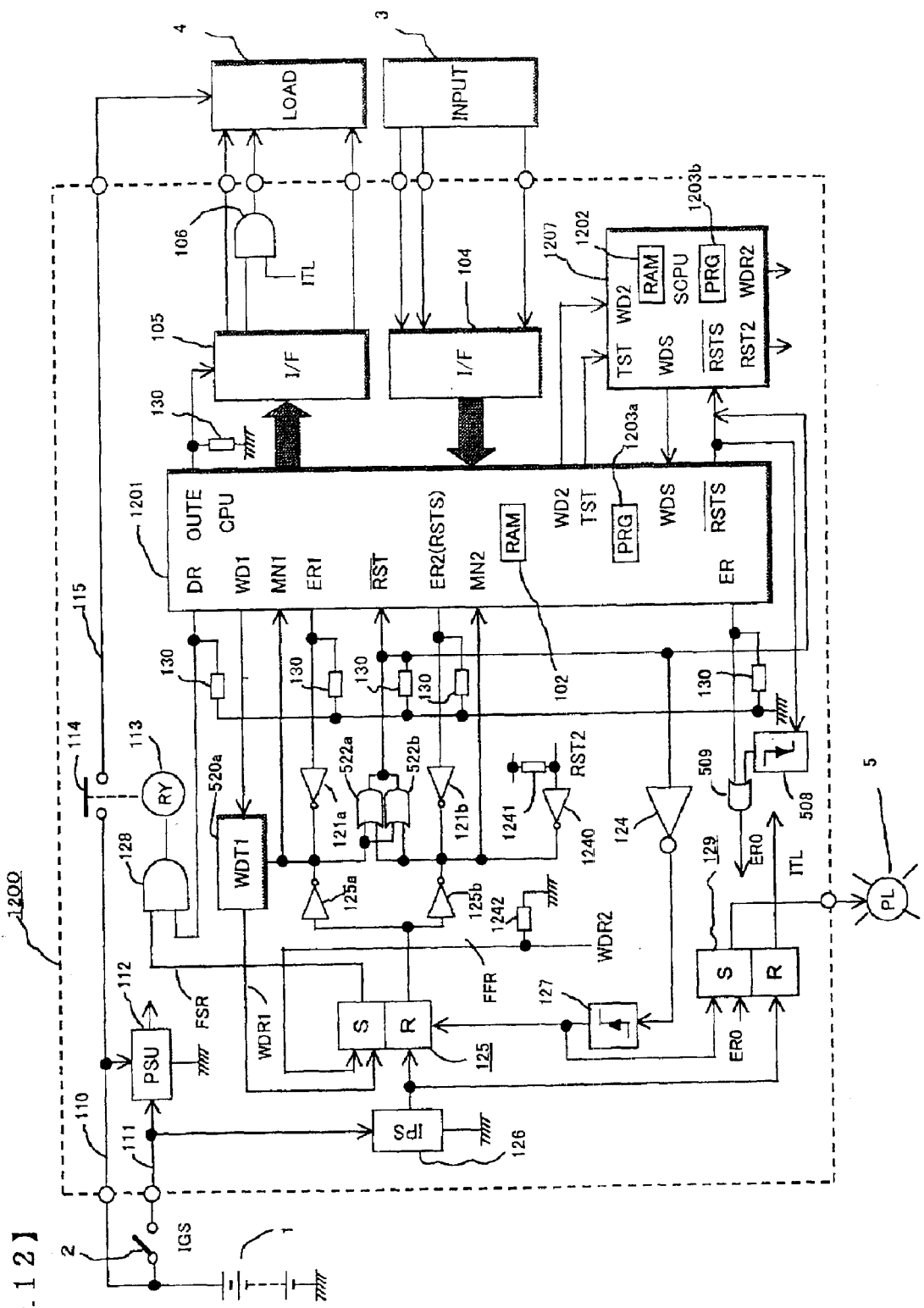
[Fig. 12]

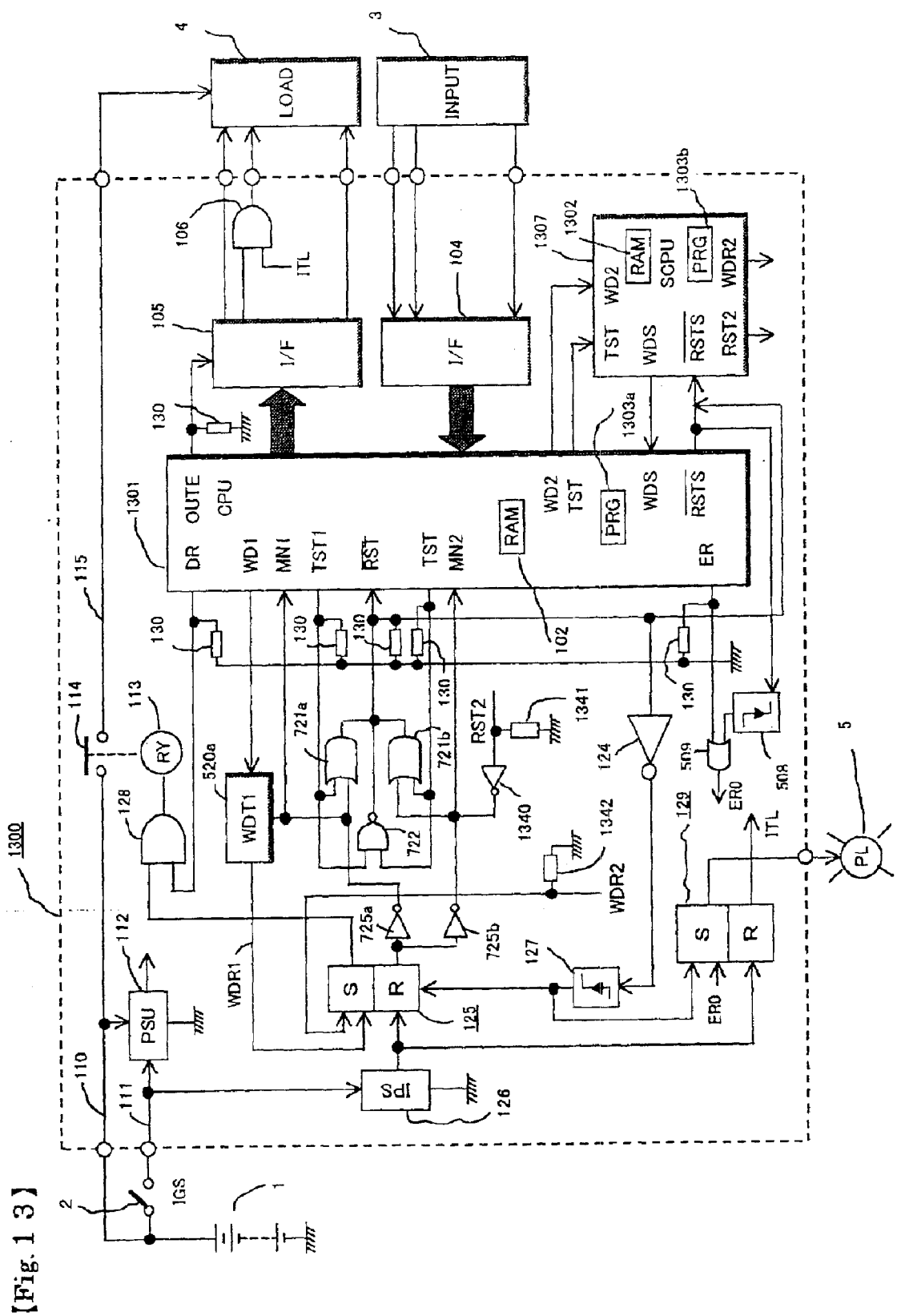
[Fig. 13]

US 6,883,123 B2

MICROPROCESSOR RUNAWAY MONITORING CONTROL CIRCUIT

BACKGROUND OF THE INVENTION

This invention relates to a microprocessor runaway monitoring control circuit for, in an electronic control unit with a built-in microprocessor (CPU) used for example for control of an engine in an automotive vehicle, improving safety by performing diagnosis on a watchdog timer circuit for monitoring runaway of the microprocessor.

Generally a runaway monitoring circuit for monitoring runaway of a microprocessor is provided on the same circuit board as the microprocessor and in the proximity of the microprocessor, and one runaway monitoring circuit is connected to each microprocessor. However, as shown in Japanese Patent Laid-Open No. H.5-81222, "2-CPU Operation Monitoring Method" (Related Art 1), sometimes one runaway monitoring circuit (watchdog timer) is provided with respect to two micro processors.

Although if a microprocessor is normal a runaway monitoring circuit monitoring it will never operate, if the microprocessor does ever become abnormal and the runaway monitoring circuit fails to operate then, there may be serious danger. Thus the reliability of a runaway monitoring circuit is extremely important, and not only are strict tests carried out in product pre-shipping inspections as a matter of course, but preferably self-diagnosis is carried out while the microprocessor and the runaway monitoring circuit are actually operating as well.

A runaway monitoring control circuit with this kind of self-diagnostic capability in related art is disclosed for example in Japanese Patent Laid-Open No. 2000-104622, "Electronic Control Unit" (Related Art 2). In this Related Art 2, the reset signal output of a watchdog timer, which is normally connected to the reset terminal of the microprocessor being monitored, is switched to an input terminal for diagnostic monitoring use; the microprocessor intentionally alters the period of a watchdog clearing signal which it supplies to the watchdog timer; and the microprocessor itself diagnoses whether or not the watchdog timer operates.

And in Japanese Patent Laid-Open No. H.6-149604, "Multiplexed System" (Related Art 3), duplex control is carried out by a pair of microprocessors to each of which is connected a watchdog timer, and when the operation of one of the watchdog timers is to be diagnosed, a switch is made to uniplex control based on control outputs only of the microprocessor whose watchdog timer is not being diagnosed, so that even if the microprocessor whose watchdog timer is being diagnosed stops, control can be continued.

(1) The Explanation of the Problem in the Prior Art

However, there are certain problems associated with the related art described above, and in circuits such as that of Related Art 1, where a watchdog timer for runaway monitoring is just connected to a microprocessor, there are the following kinds of safety issue.

The states of operation of a watchdog timer can be categorized as follows: normal non-operation, wherein the watchdog timer does not operate because the microprocessor is operating normally; normal operation, wherein the watchdog timer resets the microprocessor because the microprocessor is abnormal; active failure, wherein the watchdog timer tries to reset the microprocessor notwithstanding that the microprocessor is operating normally; and passive failure, wherein the watchdog timer fails to reset the microprocessor notwithstanding that the microprocessor is abnormal. Among these, the problematic aspects are the danger (loss of runaway monitoring function) associated with passive failure of the watchdog timer, and unintentional resetting of the microprocessor caused by active failure.

With respect to this, even with the runaway monitoring control circuit of Related Art 2, there are the shortcomings that if there is an abnormality in a switching circuit which switches the output signal for resetting the microprocessor, there is a danger that it will become impossible for the microprocessor to be reset, and that if the microprocessor runs away while diagnosing the watchdog timer, again the microprocessor will not be reset.

And in the case of Related Art 3, which is based on a completely duplex system, although its safety is high, there is the shortcoming that self-diagnostic reliability measures become necessary for additional circuits such as comparator circuits and switching circuits for the output signals of the pair of microprocessors.

SUMMARY OF THE INVENTION (2) The Object of the Invention

It is therefore a first object of the present invention to resolve the above-mentioned issues and provide a microprocessor runaway monitoring control circuit with which self-diagnosis of a watchdog timer can be carried out safely and cheaply even during operation of the microprocessor.

It is a second object of the invention to provide a microprocessor runaway monitoring control circuit improved so that passive failure, wherein the microprocessor cannot be reset when necessary, does not readily occur, and so that active failure, wherein the watchdog timer operates and resets the microprocessor wrongly, does not readily occur.

A third object of the invention is to provide a microprocessor runaway monitoring control circuit with which even when the microprocessor malfunctions temporarily due to for example noise or the like the microprocessor is reset and swiftly restored to normal operation automatically and the CPU is kept operational as long as possible.

(3) The Means to be Solved the Problem According the Invention

To achieve these objects and other objects, a first aspect of the invention provides a microprocessor runaway monitoring control circuit, for a microprocessor which controls an electrical load and generates a first watchdog clearing signal and a second watchdog clearing signal for monitoring runaway of the microprocessor. This microprocessor runaway monitoring control circuit includes a first watchdog timer, a second watchdog timer, a logic connector circuit and failure diagnosing means. The first watchdog timer receives the first watchdog clearing signal and generates a first reset signal if this first watchdog clearing signal is abnormal. The second watchdog timer receives the second watchdog clearing signal and generates a second reset signal if this second watchdog clearing signal is abnormal. The logical connector circuit resets the microprocessor by outputting an effective resetting signal when the first and second reset signals are both generated. The failure diagnosing means inputs the first and second reset signals respectively as first and second monitor signals to the microprocessor. In the microprocessor runaway monitoring control circuit, at different timing to each other, the microprocessor intentionally renders abnormal the first and second watchdog clearing signals and checks whichever of the first and second monitor signals corresponds to one of the first and second watchdog clearing signals intentionally rendered abnormal and thereby checks the operation of whichever of the first and second watchdog timers corresponding to one of the first and second watchdog clearing signals rendered abnormal.

According to this first aspect of the invention, a pair of watchdog timers which can be diagnosed alternately while the microprocessor is operating are used, and the microprocessor is reset when both of the watchdog timers operate together. Consequently, cheap and highly reliable runaway monitoring based on partial duplexing can be carried out, and as long as the two watchdog timers do not both fail actively the microprocessor can be kept operating.

A second aspect of the invention provides a microprocessor runaway monitoring control circuit, for a main microprocessor which controls an electrical load and generates a first watchdog clearing signal and a second watchdog clearing signal for runaway monitoring control of the main microprocessor. The microprocessor runaway monitoring control circuit includes a sub-microprocessor, a first watchdog timer, a second watchdog timer, runaway monitoring means a logical connector circuit and failure diagnosing means. The sub-microprocessor, cooperating with the main microprocessor, which receives the second watchdog clearing signal from the main microprocessor and generates a third watchdog clearing signal. The first watchdog timer receives the first watchdog clearing signal and generates a first reset signal if this first watchdog clearing signal is abnormal. The second watchdog timer, incorporated in the sub-microprocessor, receives the second watchdog clearing signal and generates a second reset signal if this second watchdog clearing signal is abnormal. The runaway monitoring means, incorporated in the main microprocessor, receives the third watchdog clearing signal from the sub-microprocessor and resets the sub-microprocessor by generating a third reset signal if this third watchdog clearing signal is abnormal. The logical connector circuit infers abnormality of the main microprocessor and resets the main microprocessor and the sub-microprocessor by outputting an effective resetting signal when the first and second reset signals are both generated. The failure diagnosing means inputs the first and second reset signals respectively as first and second monitor signals to the main microprocessor. In the microprocessor runaway monitoring control circuit, at different timing to each other, the main microprocessor intentionally renders abnormal the first and second watchdog clearing signals and checks whichever of the first and second monitor signals corresponds to one of the first and second watchdog clearing signals rendered abnormal and thereby checks the operation of whichever of the first and second watchdog timers corresponding to one of the first and second watchdog clearing signals intentionally rendered abnormal.

According to this second aspect of the invention, a main microprocessor and a sub-microprocessor are provided, and one of a pair of watchdog timers monitoring the operation of the main microprocessor is provided in the form of software inside the sub-microprocessor. Consequently, a cheaper duplex watchdog timer can be constructed.

A third aspect of the invention provides a microprocessor runaway monitoring control circuit according to the first aspect. In this microprocessor runaway monitoring control circuit, the microprocessor generates a first error signal when it determines that the first watchdog timer is abnormal and generates a second error signal when it determines that the second watchdog timer is abnormal. The microprocessor has first and second failure response circuits, and in response to the first error signal the first failure response circuit forcibly renders reset-effective the reset signal of the first watchdog timer and in response to the second error signal the second failure response circuit forcibly renders reset-effective the reset signal of the second watchdog timer, so that in response to the reset signal from the watchdog timer not forcibly reset the logical connector circuit generates an effective resetting signal and resets the microprocessor and thus even if one of the first and second watchdog timers is abnormally failing to generate its reset signal the effective resetting signal output can still be generated.

And a fourth aspect of the invention provides a microprocessor runaway monitoring control circuit according to the second aspect. In this microprocessor runaway monitoring control circuit, the main microprocessor generates a first error signal when it determines that the first watchdog timer is abnormal and generates a second error signal when it determines that the second watchdog timer is abnormal. The main microprocessor has first and second failure response circuits, and in response to the first error signal the first failure response circuit forcibly renders reset-effective the reset signal of the first watchdog timer and in response to the second error signal the second failure response circuit forcibly renders reset-effective the reset signal of the second watchdog timer, so that in response to the reset signal from the watchdog timer not forcibly reset the logical connector circuit generates an effective resetting signal and resets the main microprocessor and the sub-microprocessor and thus even if one of the first and second watchdog timers is abnormally failing to generate its reset signal the effective resetting signal output can still be generated.

With a microprocessor runaway monitoring control circuit according to either of these third and fourth aspects of the invention, even if one of the two watchdog timers fails passively, it is forcibly operated by a first or second failure response circuit. Consequently, monitoring of the microprocessor can be continued using the other watchdog timer.

A fifth aspect of the invention provides a microprocessor runaway monitoring control circuit according to the third aspect. In this microprocessor runaway monitoring control circuit, the failure diagnosing means, to check the normal operation of one of the failure response circuits, causes one of the first and second error signals to be generated from the microprocessor and inputted to the respective failure response circuit, and the failure diagnosing means has first and second checking means, and the first checking means checks the response of the first monitor signal to the first error signal inputted to the first failure response circuit and the second checking means checks the response of the second monitor signal to the second error signal inputted to the second failure response circuit.

And a sixth aspect of the invention provides a microprocessor runaway monitoring control circuit according to the fourth aspect. In this microprocessor runaway monitoring control circuit, the failure diagnosing means, to check the normal operation of one of the failure response circuits, causes one of the first and second error signals to be generated from the microprocessor and inputted to the respective failure response circuit, and the failure diagnosing means has first and second checking means, and the first checking means checks the response of the first monitor signal to the first error signal inputted to the first failure response circuit and the second checking means checks the response of the second monitor signal to the second error signal inputted to the second failure response circuit.

With a microprocessor runaway monitoring control circuit according to either of these fifth and sixth aspects of the invention, failure diagnosing means are provided and diagnose whether or not the failure response circuits are normal. Consequently, reliability can be increased.

A seventh aspect of the invention provides a microprocessor runaway monitoring control circuit according to the first aspect. This microprocessor runaway monitoring control circuit further comprises starting circuits for, when a power supply to the runaway monitoring control circuit is switched on, causing the effective resetting signal to be generated by forcibly rendering reset-effective for a predetermined time the reset signals of both the first and second watchdog timers. In this microprocessor runaway monitoring control circuit, the microprocessor is reset when the power supply is switched on even if one of the first and second watchdog timers is abnormal and not operating.

And an eighth aspect of the invention provides a microprocessor runaway monitoring control circuit according to the second aspect. The microprocessor runaway monitoring control circuit further comprises starting circuits for, when a power supply to the runaway monitoring control circuit is switched on, causing the effective resetting signal to be generated by forcibly rendering reset-effective for a predetermined time the reset signals of both the first and second watchdog timers. In this microprocessor runaway monitoring control circuit, the main microprocessor and the sub-microprocessor are reset when the power supply is switched on even if one of the first and second watchdog timers is abnormal and not operating.

With a microprocessor runaway monitoring control circuit according to either of these seventh and eighth aspects of the invention, even if when the supply power source is turned on the watchdog timers are both abnormal, the microprocessor is reset and abnormal starting is not carried out. Consequently, execution checking of a resetting operation including a logical connector circuit which cannot be diagnosed while the microprocessor is operating can be carried out, and safety can be improved.

A ninth aspect of the invention provides a microprocessor runaway monitoring control circuit according to the first aspect. In this microprocessor runaway monitoring control circuit, the logical connector circuit is a multiplex logical connector circuit comprising a plurality of logical connector circuits connected in parallel.

And a tenth aspect of the invention provides a microprocessor runaway monitoring control circuit according to the second aspect. In this microprocessor runaway monitoring control circuit, the logical connector circuit is a multiplex logical connector circuit comprising a plurality of logical connector circuits connected in parallel.

With a microprocessor runaway monitoring control circuit according to either of these ninth and tenth aspects of the invention, a plurality of logical connector circuits are provided in parallel to form a multiplex logical connector circuit. Consequently, safety is improved.

An eleventh aspect of the invention provides a microprocessor runaway monitoring control circuit, for a microprocessor which controls an electrical load and generates a first watchdog clearing signal and a second watchdog clearing signal for runaway monitoring control of the microprocessor and also generates a first test signal and a second test signal for testing. This microprocessor runaway monitoring control circuit comprises a first watchdog timer, a second watchdog timer, a gate circuit and failure diagosing means. The first watchdog timer receives the first watchdog clearing signal from the microprocessor and generates a first reset signal if this first watchdog clearing signal is abnormal. The second watchdog timer receives the second watchdog clearing signal from the microprocessor and generates a second reset signal if this second watchdog clearing signal is abnormal. The gate circuit, which receives the first test signal and the second test signal from the microprocessor and when receiving the first test signal stops the effective resetting signal output irrespective of the state of the first reset signal from the first watchdog timer and when receiving the second test signal stops the effective resetting signal output irrespective of the state of the second reset signal from the second watchdog timer and when receiving neither of the first and second test signals outputs the effective resetting signal in accordance with the states of the first and second reset signals. The failure diagnosing means inputs the first and second reset signals to the microprocessor as first and second monitor signals. In this microprocessor runaway monitor ng control circuit, at different timing to each other, the microprocessor generates the first test signal and the second test signal, and when generating the first test signal the microprocessor checks the operation of the first watchdog timer by intentionally rendering abnormal the first watchdog clearing signal inputted to the first watchdog timer and checking the output state of the first reset signal, and when generating the second test signal the microprocessor checks the operation of the second watchdog timer by intentionally rendering abnormal the second watchdog clearing signal inputted to the second watchdog timer and checking the output state of the second reset signal.

With a microprocessor runaway monitoring control circuit according to this eleventh aspect, a pair of watchdog timers can be diagnosed alternately while the microprocessor is operating, and even while one watchdog timer is being diagnosed the microprocessor can be reset by the other watchdog timer. Consequently, cheap and highly reliable runaway monitoring based on partial duplexing can be carried out.

A twelfth aspect of the invention provides a microprocessor runaway monitoring control circuit, for a main microprocessor which controls an electrical load and generates a first watchdog clearing signal and a second watchdog clearing signal for runaway monitoring control of the microprocessor and also generates a first test signal and a second test signal for testing. This microprocessor runaway monitoring control circuit comprises a sub-microprocessor, a first watchdog timer, a second watchdog timer, runaway monitoring means, a gate circuit and failure diagnosing means. The sub-microprocessor, cooperating with the main microprocessor, which generates a third watchdog clearing signal for runaway monitoring control of the sub-microprocessor. The first watchdog timer receives the first watchdog clearing signal from the main microprocessor and generates a first reset signal if this first watchdog clearing signal is abnormal. The second watchdog timer, incorporated in the sub-microprocessor, receives the second watchdog clearing signal from the main microprocessor and generates a second reset signal if this second watchdog clearing signal is abnormal. The runaway monitoring means, incorporated in the main microprocessor, which receives the third watchdog clearing signal from the sub-microprocessor and resets the sub-microprocessor by generating a third reset signal when the third watchdog clearing signal is abnormal. The gate circuit, which receives the first test signal and the second test signal from the main microprocessor and when receiving the first test signal stops the effective resetting signal output irrespective of the state of the first reset signal from the first watchdog timer and when receiving the second test signal stops the effective resetting signal output irrespective of the state of the second reset signal from the second watchdog timer and when receiving neither of the first and second test signals outputs the effective resetting signal and resets the main microprocessor and the sub-microprocessor in accordance with the states of the first and second reset signals. The failure diagnosing means inputs the first and second reset signals to the main microprocessor as first and second monitor signals. In this microprocessor runaway monitoring control circuit, at different timing to each other, the main microprocessor generates the first test signal and the second test signal, and when generating the first test signal the main microprocessor checks the operation of the first watchdog timer by intentionally rendering abnormal the first watchdog clearing signal inputted to the first watchdog timer and checking the output state of the first reset signal, and when generating the second test signal the main microprocessor checks the operation of the second watchdog timer by intentionally rendering abnormal the second watchdog clearing signal inputted to the second watchdog timer and checking the output state of the second reset signal.

With a microprocessor runaway monitoring control circuit according to this twelfth aspect of the invention, there are provided a main microprocessor and a sub-microprocessor; one of a pair of watchdog timers for monitoring the operation of the main microprocessor is implemented by software in the sub-microprocessor; the watchdog timers can be alternately diagnosed while the main microprocessor is operating; and even while one of the watchdog timers is being diagnosed the main microprocessor can be reset by the other watchdog timer. Consequently, cheap and highly reliable runaway monitoring based on partial duplexing can be carried out.

A thirteenth aspect of the invention provides a microprocessor runaway monitoring control circuit according to the eleventh aspect. This microprocessor runaway monitoring control circuit further includes means for continuing a test signal on the basis of a failure diagnosis result from the failure diagnosing means, which means causes the microprocessor to generate the first test signal continuously when determining that the first watchdog timer is abnormal and causes the microprocessor to generate the second test signal continuously when determining that the second watchdog timer is abnormal and so ensures that the effective reset signal is not generated as a result of abnormal operation of the first and second watchdog timers; and failure response means for forcibly resetting the microprocessor by outputting an effective resetting signal when the first and second test signals from the microprocessor are erroneously generated together.

And a fourteenth aspect of the invention provides a microprocessor runaway monitoring control circuit according to the twelfth aspect. This microprocessor runaway monitoring control circuit further includes means for continuing a test signal on the basis of a failure diagnosis result from the failure diagnosing means, which means for continuing a test signal causes the main microprocessor to generate the first test signal continuously when determining that the first watchdog timer is abnormal and causes the main microprocessor to generate the second test signal continuously when determining that the second watchdog timer is abnormal and so ensures that the effective reset signal is not generated as a result of abnormal operation of the first and second watchdog timers; and failure response means for forcibly resetting the main microprocessor and the sub-microprocessor by outputting an effective resetting signal when the first and second test signals from the main microprocessor are erroneously generated together.

With a microprocessor runaway monitoring control circuit according to either of these thirteenth and fourteenth aspects of the invention, when it is determined that the result of a diagnosis of a watchdog timer is that the watchdog timer is abnormal, the test output to the abnormal side is generated continuously so that a wrong effective resetting signal is not generated. Consequently, the abnormal watchdog timer is cut off and operation can continue. Also, because the microprocessor is stopped when erroneously the pair of test outputs are both generated, safety is improved.

A fifteenth aspect of the invention provides a microprocessor runaway monitoring control circuit according to the eleventh aspect. This microprocessor runaway monitoring control circuit further includes a starting circuit for generating an effective resetting signal when a power supply to the runaway monitoring circuit is turned on by forcibly rendering reset-effective for a predetermined time the reset signals of both of the first and second watchdog timers. In this microprocessor runaway monitoring control circuit, the microprocessor can be reset with the effective resetting signal even when both of the first and second watchdog timers are unable to operate when the power supply is turned on.

And a sixteenth aspect of the invention provides a microprocessor runaway monitoring control circuit according to the twelfth aspect. This microprocessor runaway monitoring control circuit further includes a starting circuit for generating an effective resetting signal when a power supply to the runaway monitoring circuit is turned on by forcibly rendering reset-effective for a predetermined time the reset signals of both of the first and second watchdog timers. In this microprocessor runaway monitoring control circuit, the main microprocessor and the sub-microprocessor can be reset with the effective resetting signal even when both of the first and second watchdog timers are unable to operate when the power supply is turned on.

With a microprocessor runaway monitoring control circuit according to either of these fifteenth and sixteenth aspects, even if the watchdog timers are both failing passively when the power supply switch is turned on, the microprocessor is reset and abnormal starting is not carried out.

A seventeenth aspect of the invention provides a microprocessor runaway monitoring control circuit according to the first aspect. In this microprocessor runaway monitoring control circuit, the first and second watchdog timers are timers which generate respectively first and second reset signals of a predetermined time width.

An eighteenth aspect of the invention provides a microprocessor runaway monitoring control circuit according to the second aspect. In this microprocessor runaway monitoring control circuit, the first and second watchdog timers are timers which generate respectively first and second reset signals of a predetermined time width.

A nineteenth aspect of the invention provides a microprocessor runaway monitoring control circuit according to the eleventh aspect. In this microprocessor runaway monitoring control circuit, the first and second watchdog timers are timers which generate respectively first and second reset signals of a predetermined time width.

And a twentieth aspect of the invention provides a microprocessor runaway monitoring control circuit according to the twelfth aspect. In this microprocessor runaway monitoring control circuit, the first and second watchdog timers are timers which generate respectively first and second reset signals of a predetermined time width.

With a microprocessor runaway monitoring control circuit according to any of these seventeenth through twentieth aspects, the watchdog timers output reset signals of a predetermined time width. Consequently, even if one of the watchdog timers becomes abnormal the other watchdog timer functions effectively, and it does not happen that the watchdog timers both are not reset or that they both are persistently reset.

A twenty-first aspect of the invention provides a microprocessor runaway monitoring control circuit according to the first aspect. In this microprocessor runaway monitoring control circuit, the microprocessor generates an error signal when the failure diagnosing means determines that at least one of the first and second watchdog timers is abnormal. The runaway monitoring circuit further includes failure occurrence storing means for storing the error signal and the effective resetting signal and then clearing the stored error signal and effective resetting signal and setting to a ready-to-store state when the power supply to the runaway monitoring circuit is turned on and reporting means for outputting at least one of the stored error signal and effective resetting signal as a report signal.

A twenty-second aspect of the invention provides a microprocessor runaway monitoring control circuit according to the second aspect. In this microprocessor runaway monitoring control circuit, the main microprocessor generates an error signal when the failure diagnosing means determines that at least one of the first and second watchdog timers is abnormal. The runaway monitoring circuit further includes failure occurrence storing means for storing the error signal and the effective resetting signal and then clearing the stored error signal and effective resetting signal and setting to a ready-to-store state when the power supply to the runaway monitoring circuit is turned on and reporting means for outputting at least one of the stored error signal and effective resetting signal as a report signal.

A twenty-third aspect of the invention provides a microprocessor runaway monitoring control circuit according to the eleventh aspect. In this microprocessor runaway monitoring control circuit, the microprocessor generates an error signal when the failure diagnosing means determines that at least one of the first and second watchdog timers is abnormal. The runaway monitoring circuit further includes failure occurrence storing means for storing the error signal and the effective resetting signal and then clearing the stored error signal and effective resetting signal and setting to a ready-to-store state when the power supply to the runaway monitoring circuit is turned on and reporting means for outputting at least one of the stored error signal and effective resetting signal as a report signal.

And a twenty-fourth aspect of the invention provides a microprocessor runaway monitoring control circuit according to the twelfth aspect. In this microprocessor runaway monitoring control circuit, the main microprocessor generates an error signal when the failure diagnosing means determines that at least one of the first and second watchdog timers is abnormal. The runaway monitoring circuit further includes failure occurrence storing means for storing the error signal and the effective resetting signal and then clearing the stored error signal and effective resetting signal and setting to a ready-to-store state when the power supply to the runaway monitoring circuit is turned on and reporting means for outputting at least one of the stored error signal and effective resetting signal as a report signal.

With a microprocessor runaway monitoring control circuit according to any of these twenty-first through twenty-fourth aspects, the occurrence of a microprocessor abnormality or an abnormal diagnosis of a watchdog timer is stored and reported. Consequently, the user is made aware of the abnormality and can decided whether to continue operation accordingly.

A twenty-fifth aspect of the invention provides a microprocessor runaway monitoring control circuit according to the first aspect. This microprocessor runaway monitoring control circuit further includes a sub-microprocessor which is subordinate to the microprocessor and shares overall control therewith. In this microprocessor runaway monitoring control circuit, the microprocessor includes runaway monitoring means for the sub-microprocessor for monitoring a watchdog timer clearing signal generated by the sub-microprocessor and when there is an abnormality thereof supplying a reset signal to and thereby resetting the sub-microprocessor, and the effective resetting signal supplied from the first and second watchdog timers resets the microprocessor and the sub-microprocessor.

And a twenty-sixth aspect of the invention provides a microprocessor runaway monitoring control circuit according to the eleventh aspect. This microprocessor runaway monitoring control circuit further includes a sub-microprocessor which is subordinate to the microprocessor and shares overall control therewith. In this microprocessor runaway monitoring cotrol circuit, the microprocessor includes runaway monitoring means for the sub-microprocessor for monitoring a watchdog timer clearing signal generated by the sub-microprocessor and when there is an abnormality thereof supplying a reset signal to and thereby resetting the sub-microprocessor, and the effective resetting signal supplied from the first and second watchdog timers resets the microprocessor and the sub-microprocessor.

With either of these twenty-fifth and twenty-sixth aspects of the invention, a main microprocessor and a sub-microprocessor are provided; the main microprocessor performs runaway monitoring of the sub-microprocessor, and when there is an abnormality of the sub-microprocessor the main microprocessor resets the sub-microprocessor; and when there is an abnormality of the main microprocessor, the sub-microprocessor is also reset. Consequently, special monitoring circuits are not necessary for runaway monitoring.

A twenty-seventh aspect of the invention provides a microprocessor runaway monitoring control circuit according to the first aspect. This microprocessor runaway monitoring control circuit further includes switching means for, when a supply power source supplying power to the runaway monitoring control circuit is used as a load power supply and power is supplied to the electrical load from this load power supply, switching ON/OFF the connection between the load power supply and the electrical load. In this microprocessor runaway monitoring control circuit, the switching means is switched OFF when the supply power source is turned on and when the effective resetting signal is outputted and the switching means is switched ON when the effective resetting signal output is canceled.

And a twenty-eighth aspect of the invention provides a microprocessor runaway monitoring control circuit according to the eleventh aspect. This microprocessor runaway monitoring control circuit further includes switching means for, when a supply power source supplying power to the runaway monitoring control circuit is used as a load power supply and power is supplied to the electrical load from this load power supply, switching ON/OFF the connection between the load power supply and the electrical load. In this microprocessor runaway monitoring control circuit, the switching means is switched OFF when the supply power source is turned on and when the effective resetting signal is outputted and the switching means is switched ON when the effective resetting signal output is canceled.

With a microprocessor runaway monitoring control circuit according to either of these twenty-seventh and twenty-eighth aspects of the invention, switching means are provided for switching ON/OFF the load power supply. Consequently, if the logical connector circuit or the pair of gate elements are not functioning normally, the load power supply does not work and safety is improved; when there is an abnormality of the microprocessor the load power supply is cut off and safety is improved; and when it is a temporary microprocessor abnormality caused by a noise malfunction or the like, the load power supply is automatically switched on again so that operation can continue.

A twenty-ninth aspect of the invention provides a microprocessor runaway monitoring control circuit according to the first aspect. In this microprocessor runaway monitoring control circuit, the microprocessor generates an error signal when the failure diagnosing means determines that at least one of the first and second watchdog timers is abnormal. The runaway monitoring circuit further includes failure occurrence storing means for storing the error signal and the effective resetting signal and then clearing the stored error signal and effective resetting signal and setting to a ready-to-store state when the power supply to the runaway monitoring circuit is turned on, and drive-stopping means for stopping the microprocessor output to at least one electrical load when the failure occurrence storing means stores the error signal and the effective resetting signal.

And a thirtieth aspect of the invention provides a microprocessor runaway monitoring control circuit according to the eleventh aspect. In this microprocessor runaway monitoring control circuit, the microprocessor generates an error signal when the failure diagnosing means determines that at least one of the first and second watchdog timers is abnormal. The runaway monitoring circuit further includes failure occurrence storing means for storing the error signal and the effective resetting signal and then clearing the stored error signal and effective resetting signal and setting to a ready-to-store state when the power supply to the runaway monitoring circuit is turned on, and drive-stopping means for stopping the microprocessor output to at least one electrical load when the failure occurrence storing means stores the error signal and the effective resetting signal.

With a microprocessor runaway monitoring control circuit according to either of these twenty-ninth and thirtieth aspects of the invention, there are provided drive-stopping means, and driving of electrical loads can be stopped when there is an abnormality of the microprocessor or an abnormal diagnosis of a watchdog timer. Consequently, operation of the microprocessor can be continued more safely.

A thirty-first aspect of the invention provides a microprocessor runaway monitoring control circuit according to the second aspect. In this microprocessor runaway monitoring control circuit, the sub-microprocessor controls a different electrical load from the main microprocessor and power is supplied to the electrical loads controlled by the main microprocessor and the sub-microprocessor with a supply power source supplying power to the runaway monitoring control circuit as a load power supply. The runaway monitoring control circuit further includes switching means for switching ON/OFF the connection between the load power supply and the electrical loads, the switching means being switched OFF when the supply power source is turned on and when the effective resetting signal is outputted and switched ON when the effective resetting signal output is canceled.

A thirty-second aspect of the invention provides a microprocessor runaway monitoring control circuit according to the twelfth aspect. In this microprocessor runaway monitoring control circuit, the sub-microprocessor controls a different electrical load from the main microprocessor and power is supplied to the electrical loads controlled by the main microprocessor and the sub-microprocessor with a supply power source supplying power to the runaway monitoring control circuit as a load power supply. The runaway monitoring control circuit further includes switching means for switching ON/OFF the connection between the load power supply and the electrical loads, the switching means being switched OFF when the supply power source is turned on and when the effective resetting signal is outputted and switched ON when the effective resetting signal output is canceled.

A thirty-third aspect of the invention provides a microprocessor runaway monitoring control circuit according to the twenty-fifth aspect. In this microprocessor runaway monitoring control circuit, the sub-microprocessor controls a different electrical load from the main microprocessor and power is supplied to the electrical loads controlled by the main microprocessor and the sub-microprocessor with a supply power source supplying power to the runaway monitoring control circuit as a load power supply. The runaway monitoring control circuit further includes switching means for switching ON/OFF the connection between the load power supply and the electrical loads, the switching means being switched OFF when the supply power source is turned on and when the effective resetting signal is outputted and switched ON when the effective resetting signal output is canceled.

And a thirty-fourth aspect of the invention provides a microprocessor runaway monitoring control circuit according to the twenty-sixth aspect. In this microprocessor runaway monitoring control circuit, the sub-microprocessor controls a different electrical load from the main microprocessor and power is supplied to the electrical loads controlled by the main microprocessor and the sub-microprocessor with a supply power source supplying power to the runaway monitoring control circuit as a load power supply. The runaway monitoring control circuit further includes switching means for switching ON/OFF the connection between the load power supply and the electrical loads, the switching means being switched OFF when the supply power source is turned on and when the effective resetting signal is outputted and switched ON when the effective resetting signal output is canceled.

With a microprocessor runaway monitoring control circuit according to any of these thirty-first through thirty-fourth aspects of the invention, there are provided switching means for switching ON/OFF the load power supply connected to the main microprocessor and the sub-microprocessor. Consequently, if the logical connector circuit or the pair of gate elements are not functioning normally, the load power supply does not work and safety is improved; when there is an abnormality of the microprocessor the load power supply is cut off and safety is improved; and when it is a temporary microprocessor abnormality caused by a noise malfunction or the like, the load power supply is automatically switched on again so that operation can continue.

A thirty-fifth aspect of the invention provides a microprocessor runaway monitoring control circuit according to the second aspect. In this microprocessor runaway monitoring control circuit, the sub-microprocessor controls a different electrical load from the main microprocessor and the main microprocessor generates an error signal when the failure diagnosing means determines that at least one of the first and second watchdog timers is abnormal. The runaway monitoring circuit further includes failure occurrence storing means for storing the error signal and the effective resetting signal and then clearing the stored error signal and effective resetting signal and setting to a ready-to-store state when the power supply to the runaway monitoring circuit is turned on, and drive-stopping means for stopping the output to at least one of the electrical loads controlled by the main microprocessor and the sub-microprocessor when the failure occurrence storing means stores the error signal and the effective resetting signal.

A thirty-sixth aspect of the invention provides a microprocessor runaway monitoring control circuit according to the twelfth aspect. In this microprocessor runaway monitoring control circuit, the sub-microprocessor controls a different electrical load from the main microprocessor and the main microprocessor generates an error signal when the failure diagnosing means determines that at least one of the first and second watchdog timers is abnormal. The runaway monitoring circuit further includes failure occurrence storing means for storing the error signal and the effective resetting signal and then clearing the stored error signal and effective resetting signal and setting to a ready-to-store state when the power supply to the runaway monitoring circuit is turned on, and drive-stopping means for stopping the output to at least one of the electrical loads controlled by the main microprocessor and the sub-microprocessor when the failure occurrence storing means stores the error signal and the effective resetting signal.

A thirty-seventh aspect of the invention provides a microprocessor runaway monitoring control circuit according to the twenty-fifth aspect. In this microprocessor runaway monitoring control circuit, the sub-microprocessor controls a different electrical load from the main microprocessor and the main microprocessor generates an error signal when the failure diagnosing means determines that at least one of the first and second watchdog timers is abnormal. The runaway monitoring circuit further includes failure occurrence storing means for storing the error signal and the effective resetting signal and then clearing the stored error signal and effective resetting signal and setting to a ready-to-store state when the power supply to the runaway monitoring circuit is turned on, and drive-stopping means for stopping the output to at least one of the electrical loads controlled by the main microprocessor and the sub-microprocessor when the failure occurrence storing means stores the error signal and the effective resetting signal.

And a thirty-eighth aspect of the invention provides a microprocessor runaway monitoring control circuit according to the twenty-sixth aspect. In this microprocessor runaway monitoring control circuit, the sub-microprocessor controls a different electrical load from the main microprocessor and the main microprocessor generates an error signal when the failure diagnosing means determines that at least one of the first and second watchdog timers is abnormal. The runaway monitoring circuit further includes failure occurrence storing means for storing the error signal and the effective resetting signal and then clearing the stored error signal and effective resetting signal and setting to a ready-to-store state when the power supply to the runaway monitoring circuit is turned on, and drive-stopping means for stopping the output to at least one of the electrical loads controlled by the main microprocessor and the sub-microprocessor when the failure occurrence storing means stores the error signal and the effective resetting signal.

With a microprocessor runaway monitoring control circuit according to any of these thirty-fifth through thirty-eighth aspects of the invention, there are provided drive-stopping means, and driving of electrical loads controlled by either the main microprocessor or the sub-microprocessor can be stopped when there is an abnormality of a microprocessor or an abnormal diagnosis of a watchdog timer. Consequently, operation can be continued more safely.

A thirty-ninth aspect of the invention provides a microprocessor runaway monitoring control circuit according to the second aspect. In this microprocessor runaway monitoring control circuit, the failure diagnosing means inputs the state of the first reset signal to the main microprocessor as a first monitor signal and the main microprocessor checks the operation of the first watchdog timer by intentionally rendering abnormal the first watchdog clearing signal and checking the response of the first monitor signal, and failure diagnosis of the second watchdog timer is carried out by the runaway monitoring means.

And a fortieth aspect of the invention provides a microprocessor runaway monitoring control circuit according to the twelfth aspect. In this microprocessor runaway monitoring control circuit, the failure diagnosing means inputs the state of the first reset signal to the main microprocessor as a first monitor signal and the main microprocessor checks the operation of the first watchdog timer by intentionally rendering abnormal the first watchdog clearing signal and checking the response of the first monitor signal, and failure diagnosis of the second watchdog timer is carried out by the runaway monitoring means.

With a microprocessor runaway monitoring control circuit according to either of these thirty-ninth and fortieth aspects of the invention, abnormality diagnosis of the second watchdog timer of the sub-microprocessor is carried out by runaway monitoring means consequently, there is no need for the main microprocessor to perform control such as intentionally rendering abnormal a second watchdog timer clearing signal, and the burden on the main microprocessor is lightened.

A forty-first aspect of the invention provides a microprocessor runaway monitoring control circuit according to the thirty-ninth aspect. In this microprocessor runaway monitoring control circuit, the sub-microprocessor receives supply of a test mode signal from the main microprocessor at the time of a test and includes forced outputting means which when receiving the test mode signal forcibly generates the second reset signal and supplies it to the gate circuit, and the response of the second monitor signal to the second reset signal forcibly generated by the sub-microprocessor is checked and a diagnosis of whether or not the second reset signal generated by the sub-microprocessor is reaching the gate circuit is possible.

And a forty-second aspect of the invention provides a microprocessor runaway monitoring control circuit according to the fortieth aspect. In this microprocessor runaway monitoring control circuit, the sub-microprocessor receives supply of a test mode signal from the main microprocessor at the time of a test and includes forced outputting means which when receiving the test mode signal forcibly generates the second reset signal and supplies it to the gate circuit, and the response of the second monitor signal to the second reset signal forcibly generated by the sub-microprocessor is checked and a diagnosis of whether or not the second reset signal generated by the sub-microprocessor is reaching the gate circuit is possible.

In a microprocessor runaway monitoring control circuit according to either of these forty-first and forty-second aspects of the invention, there are provided forced outputting means. Consequently, it can be checked whether or not a second resetting signal generated by the sub-microprocessor has reached the logical connector circuit or the gate circuit.

A forty-third aspect of the invention provides a microprocessor runaway monitoring control circuit according to the second aspect. This microprocessor runaway monitoring control circuit further includes a default circuit for, until the sub-microprocessor has started and is operating normally, making the second reset signal effective so that the effective resetting signal is generated in response to the first reset signal generated by the watchdog timer.

And a forty-fourth aspect of the invention provides a microprocessor runaway monitoring control circuit according to the twelfth aspect. This microprocessor runaway monitoring control circuit further includes a default circuit for, until the sub-microprocessor has started and is operating normally, making the second reset signal effective so that the effective resetting signal is generated in response to the first reset signal generated by the watchdog timer.

In a microprocessor runaway monitoring control circuit according to either of these forty-third and forty-fourth aspects of the invention, there is provided a default circuit for, until the sub-microprocessor has started normally, rendering effective the reset signal generated by the other watchdog timer. Consequently, even if the rise of the subordinate sub-microprocessor lags that of the main microprocessor, the main microprocessor can be started normally.

BRIEF DESCRIPTION OF THE DRAWINGS

FIG. 1 is a circuit diagram of a first preferred embodiment of a microprocessor runaway monitoring control circuit according to the invention;

FIG. 2 is a circuit digram of a watchdog timer in the first preferred embodiment;

FIGS. 3A through 3N are time charts illustrating the operation of the microprocessor runaway monitoring control circuit of the first preferred embodiment;

FIG. 4 is a flow chart illustrating the operation of the microprocessor runaway monitoring control circuit of the first preferred embodiment;

FIG. 5 is a circuit diagram of a second preferred embodiment of a microprocessor runaway monitoring control circuit according to the invention;

FIG. 6 is a circuit diagram of a watchdog timer in the second preferred embodiment;

FIG. 7 is a circuit diagram of a third preferred embodiment of a microprocessor runaway monitoring control circuit according to the invention;

FIG. 8 is a flow chart illustrating the operation of the microprocessor runaway monitoring control circuit of the third preferred embodiment;

FIG. 9 is a circuit diagram of a fourth preferred embodiment of a microprocessor runaway monitoring control circuit according to the invention;

FIG. 10 is a circuit diagram of a fifth preferred embodiment of a microprocessor runaway monitoring control circuit according to the invention;

FIG. 11 is a circuit diagram of a sixth preferred embodiment of a microprocessor runaway monitoring control circuit according to the invention;

FIG. 12 is a circuit diagram of a seventh preferred embodiment of a microprocessor runaway monitoring control circuit according to the invention; and FIG. 13 is a circuit diagram of an eighth preferred embodiment of a microprocessor runaway monitoring control circuit according to the invention.

DETAILED DESCRIPTION OF THE PREFERRED EMBODIMENTS

[First Preferred Embodiment]
(1) Detailed Explanation of Construction of First Preferred Embodiment A block diagram of a first preferred embodiment of a microprocessor runaway monitoring control circuit according to the invention is shown in FIG. 1.

In FIG. 1, the reference number 100 denotes an electronic apparatus such as an engine control unit for use in an automotive vehicle. A power supply 1 such as for example a vehicle battery is directly connected to this electronic apparatus 100 via a power supply switch 2.

The reference number 3 denotes a group of input sensors which provide control inputs to the electronic apparatus 100; 4 a group of electrical loads supplied with control outputs by the electronic apparatus 100; and 5 a warning/display device controlled by the electronic apparatus 100. The internal construction of the electronic apparatus 100 will now be described.

The reference number 101 denotes a microprocessor having a RAM memory 102 for computational processing use and a nonvolatile program memory 103 such as a flash memory; 104 an input interface circuit serving the input sensor group 3; and 105 an output interface circuit serving the electrical loads 4. The RAM memory 102, the program memory 103, the input interface 104 and the output interface 105 are connected to the microprocessor 101 by a bus.

The reference number 106 denotes a drive-stopping gate element, provided as a control output circuit serving some of the electrical loads 4. This gate element is controlled by an interlock signal ITL, which will be further discussed later.

The reference number 110 denotes a first power supply line, connected to the power supply 1; 111 a second power supply line, connected to the power supply 1 by way of the power supply switch 2; 112 a power supply unit, supplied with power from the first and second power supply lines 110 and 111, for supplying a stabilization control power supply used in the electronic apparatus 100; 113 a load power supply relay having output contacts 114; and 115 a third power supply line, connected to the first power supply line 110 by way of the output contacts 114, for supplying power to the electrical loads 4.

The reference numerals 120a and 120b respectively denote first and second watchdog timers, which will be further discussed later with reference to FIG. 2. These timers respectively receive supplies of first and second watchdog clearing signals WD1 and WD2, which are pulse series generated by the microprocessor 101, and, when the pulse widths of these clearing signals exceed a predetermined value, generate first and second reset signals and supply these as first and second monitor signals MN1, MN2 to the microprocessor 101.

The reference numerals 121a and 121b denote first and second failure response circuits for, in response to the actions of first and second error outputs ER1, ER2 respectively, which will be further discussed later with reference to FIG. 4, forcibly causing reset signal outputting circuits of the first and second watchdog timers 120a, 120b to operate to reset-effective states. And 122 is a logical connector circuit, which acts when the first and second watchdog timers 120a and 120b have both acted and supplies an effective resetting signal output (RST) to the microprocessor 101. This preferred embodiment is so constructed that the microprocessor 101 is reset when the logic level of the logical connector circuit 122 is "L".

The first and second reset signals generated by the first and second watchdog timers 120a, 120b assume the logic level "L" when the first and second watchdog clearing signals WD1 and WD2 are abnormal.

The first and second error outputs ER1 and ER2 assume the logic level "H" when an error has occurred.

The logical connector circuit 122 consists of a logical OR element and the first and second failure response circuits 121a and 121b are inverting logical elements, and for example when the first watchdog timer 120a has suffered a failure abnormality to the logic level "H" side, the respective input of the logical connector circuit 122 is forcibly driven to the logic level "L" by the first error output ER1 and the first failure response circuit 121a, so that an effective resetting signal output (RST) can be generated by an action of the second watchdog timer 120b.

The reference number 123 denotes a one-shot timer, driven via an inverting logical element 124 connected to the resetting signal (RST) input terminal of the microprocessor 101, which generates a watchdog timer resetting signal WDR, a one-shot pulse of a predetermined duration t3, after a predetermined time T1 from when the effective resetting signal output (RST) acts (assumes the logic level "L"), and this signal WDR resets the first and second reset signals generated and stored by the first and second watchdog timers 120a, 120b.

The reference number 125 denotes a reset completion memory device consisting of a flip-flop circuit; 125a, 125b are first and second starting circuits, connected to a "reset" output of this memory device, for driving the inputs of the logical connector circuit 122; 126 is a power supply rise pulse generating circuit which generates an initialization pulse IPS of a predetermined duration t1 when the power supply switch 2 is turned on; and 127 is a rise pulse generating circuit which generates a pulse output of a predetermined duration t2 and resets the reset completion memory device 125 when the output of the inverting logical element 124 changes from the logic level "L" to "H". The reset completion memory device 125 is reset when the power supply is turned on and when the effective resetting signal output (RST) arises, and when the effective resetting signal output (RST) is canceled it is set by the output of the one-shot timer 123 and records that resetting of the microprocessor 101 has been completed.

The reference number 128 denotes a gate element for stopping the load power supply, provided in the driving circuit of the load power supply relay 113. This gate element is a logical AND element which connects the "set" output FSR of the reset completion memory device 125 with a control output DR generated by the microprocessor 101 at substantially the same time as the microprocessor 101 generates an output-permitting signal output OUTE, which is a predetermined time T2 from when the effective resetting signal output (RST) to the microprocessor 101 is canceled.

Whereas the output-permitting signal output OUTE is outputted constantly as long as the microprocessor 101 is operating normally after finishing initialization processing, the control output DR is controlled by a control program of the microprocessor 101, and when for some reason the load power supply needs to be cut, the control output DR can be brought to the logic level "L" to achieve this.

The output-permitting signal output OUTE acts on the output interface circuit 105, and until the microprocessor 101 generates the output-permitting signal output OUTE the control outputs to all of the electrical loads 4 are cut.

The reference number 129 denotes a failure occurrence memory device consisting of a flip-flop circuit. This memory device is set by an error output ER (details of which will be explained with reference to FIG. 4), equivalent to the logical OR of the first and second error outputs ER1 and ER2 generated by the microprocessor 101, and by the output of the rise pulse generating circuit 127, and is reset by the initialization pulse IPS from the power supply rise pulse generating circuit 126. It drives the warning/display device 5 with its "set" output and controls the drive-stopping gate element 106 with its "reset" output.

After diagnosing the first and second watchdog timers 120a, 120b in turn as will be discussed later, the microprocessor 101 generates a monitor resetting signal output MNR for canceling intentionally generated and stored first and second reset signals of the first and second watchdog timers 120a, 120b.

The reference number 130 denotes pull-down resistances connected to the terminals for the first and second error outputs ER1 and ER2, the reset terminal to which the effective resetting signal output (RST) is supplied, and the terminals for the monitor resetting signal output MNR, the error output ER and the output-permitting signal output OUTE. These pull-down resistances are for bringing the logic level of the terminals to the safe side "L" when the microprocessor 101 is stopped.

FIG. 2 is a detailed circuit diagram of either of the watchdog timers in FIG. 1. In FIG. 2, the reference number 120 denotes a watchdog timer representing the first watchdog timer 120a or the second watchdog timer 120b; WDn is a watchdog clearing signal representing the first watchdog clearing signal WD1 or the second watchdog clearing signal WD2; MNn is a reset signal (monitor signal) representing the first reset signal (first monitor signal) MN1 or the second reset signal (second monitor signal) MN2; and WDR is the watchdog timer resetting signal.

The reference number 200 denotes a comparator; 201a and 201b are positive and negative control power supply lines; 202a is a charging resistance for charging a capacitor 202b; and 203a and 203b are voltage-dividing resistances. The charging resistance 202a and the capacitor 202b are connected in series between the power supply lines 201a and 201b, and so are the voltage-dividing resistances 203a and 203b. The non-inverting input of the comparator 200 is connected to a connection point between the charging resistance 202a and the capacitor 202b, and the inverting input of the comparator 200 is connected to a connection point between the voltage-dividing resistances 203a and 203b. When the charge voltage of the capacitor 202b exceeds the division voltage of the voltage-dividing resistances 203a and 203b, a flip-flop device 208 is reset.

The reference numeral 205a denotes a differentiating capacitor, and 206a a rise-detecting resistance connected in series with this capacitor 205a. When the watchdog clearing signal WDn changes from the logic level "L" to the logic level "H", a voltage arises across the rise-detecting resistance 206a, and a charge on the capacitor 202b is discharged through an output-inverting element 204a.

The reference numeral 205b denotes a differentiating capacitor connected to the output of an inverting logical element 207, and 206b is a rise-detecting resistance connected in series with this capacitor 205b. When the watchdog clearing signal WDn changes from the logic level "H" to the logic level "L", a voltage arises across the rise-detecting resistance 206b, and a charge on the capacitor 202b is discharged through an output-inverting element 204b.

Accordingly, at the time of a rise or a fall edge of the watchdog clearing signal WDn the capacitor 202b is discharged, and between edges it is charged by the charging resistance 202a; and consequently, when the pulse width of the watchdog clearing signal WDn becomes large, the maximum charge voltage of the capacitor 202b becomes high, and when the pulse width rises above a predetermined duration the flip-flop device 208 is reset via the comparator 200.

The flip-flop device 208 is also reset when the power supply is turned on, by a capacitor 209a and a resistance 209b, and is set by the watchdog timer resetting signal WDR. The "set" output of the flip-flop device 208 is inputted to the microprocessor 101 as the reset signal (monitor signal) MNn.

The reference number 210 denotes an inverting logical element connected to the "reset" output of the flip-flop device 206, and the output of this inverting logical element 210 is connected in parallel with the capacitor 202b so that for as long as the flip-flop device 208 is "reset" there is no charging of the capacitor 202b.

Accordingly, whereas when the pulse width of the watchdog clearing signal WDn rises above a predetermined duration the flip-flop device 208 is reset and its "set" output falls to the logic level "L", when the watchdog timer resetting signal WDR rises to the logic level "H" the flip-flop device 208 is set and the logic level of its "set" output MNn rises to "H" and the reset signal to the microprocessor 101 is thereby canceled.

(2) Detailed Description of Operation of First Preferred Embodiment

FIGS. 3(a) through 3(n) are time charts illustrating the operation of the electronic apparatus 100 shown in FIG. 1, and particularly how the different parts operate when the runaway monitoring circuit is working normally.

When in FIG. 3(a) the power supply switch 2 is turned on, as shown in FIG. 3(b) an initialization pulse IPS is generated for a time t1 by the power supply rise pulse generating circuit 126; the reset completion memory device 125 and the failure occurrence memory device 129 are initialized to their "reset" states; and an effective resetting signal output is supplied to the reset input (RST) of the microprocessor 101 by way of the first and second starting circuits 125a, 125b and the logical connector circuit 122.

As a result, by way of the inverting logical device 124 the one-shot timer 123 is activated and, after the predetermined time T1, generates a watchdog timer resetting signal WDR of duration t3, as shown in FIG. 3H.

Along with this, as shown in FIGS. 3(c), 3(d) and 3(e), the "set" output FSR of the reset completion memory device 125 arises; the outputs of the first and second starting circuits 125a, 125b rise to the logic level "H"; the reset signals (monitor signals MN1, MN2) of the first and second watchdog timers 120a, 120b rise to the logic level "H"; and consequently, as shown in FIG. 3(f), the action of the logical connector circuit resetting the microprocessor 101 is canceled.

When the action resetting the microprocessor 101 is canceled, the microprocessor 101 executes an initialization program and then starts to execute a control program.

Along with the commencement of execution of these programs, the first and second watchdog clearing signals WD1 and WD2 are generated, as shown in FIGS. 3(i) and 3(j), and after the predetermined time T2 from the start of program execution the output-permitting signal output OUTE and the control output DR arise, as shown in FIGS. 3(m) and 3(n), and the load power supply relay 113 operates.

In this way the microprocessor 101 executes a control program normally, and the electrical loads 4 are controlled. Now, a case will be explained in which at a time Tx a temporary abnormality caused by noise malfunction arises in the microprocessor 101, and either the first and second watchdog clearing signals WD1 and WD2 both stop or their generated pulse widths both rise above a predetermined value. In this case, first, as shown in FIGS. 3(d) and 3(e), the first and second reset signals (the monitor signals MN1, MN2) fall to the logic level "L", and as a result, as shown in FIG. 3(f), the effective resetting signal output (RST) of the logical connector circuit 122 falls to the logic level "L".

Along with this, as shown in FIG. 3(g), the rise pulse generating circuit 127 generates a pulse PLS of a duration t2, and as shown in FIG. 3(c) the reset completion memory device 125 is reset and its "set" output falls to the logic level "L", and the load power supply relay 113 is de-energized.

Also, the failure occurrence memory device 129 is set by the pulse PLS, and as shown in FIG. 3(l) the interlock signal ITL, which is the "reset" output of the failure occurrence memory device 129, falls to the logic level "L", closing the drive-stopping gate element 106, while the "set" output of the failure occurrence memory device 129 operates the warning/display device 5.

And as a consequence of the effective resetting signal output (RST) falling to the logic level "L" and the microprocessor 101 being reset, the output-permitting signal output OUTE and the control output DR also assume the logic level "L", as shown in FIGS. 3(n) and 3(m).

Also, after the predetermined time T1 from when the effective resetting signal output (RST) fell to the logic level "L" and the microprocessor 101 was reset, the one-shot timer 123 generates a pulse of the duration t3, as shown in FIG. 3(h), and sets the reset completion memory device 125 and cancels the actions of the first and second watchdog timers. Consequently, the microprocessor 101 starts to operate normally again.

However, because the failure occurrence memory device 129 is still in its "set" state, the interlock signal ITL is still at the logic level "L", as shown in FIG. 3(l), and the warning/display device 5 is still operating.

Next, a case will be explained in which at a time Ty, as shown in FIG. 3(i), intentionally either the first watchdog clearing signal WD1 has been stopped or its pulse width has risen above a predetermined value. In this case, as shown in FIG. 3(d) the reset signal of the first watchdog timer 120a (the first monitor signal MN1) changes to the logic level "L", but because the second reset signal (the monitor signal MN2) is still at the logic level "H", the effective resetting signal output (RST), which is the output of the logical connector circuit 122, is still at the logic level "H" and therefore the microprocessor 101 is not reset.

After the microprocessor 101 has carried out a diagnosis of the first watchdog timer 120a by the control described above, as shown in FIG. 3(k) it generates the monitor resetting signal output MNR and resets the first watchdog timer 120a, so that the first reset signal (the monitor signal MN1) returns to the logic level "H", as shown in FIG. 3(d), and the first watchdog clearing signal WD1 also is generated as a normal pulse.

FIG. 4 is a flow chart illustrating the operation of failure diagnosing means in the device shown in FIG. 1.

In FIG. 4, the reference number 400 denotes a diagnosis start step; 401 a step, carried out after this diagnosis start step, of determining whether or not the logic level of the second monitor signal MN2 is "L"; 402 a step, carried out when the result of this determining step is NO, of generating the first error output ER1; 403 a step, carried out after this step 402, of determining whether or not the first monitor signal MN1 has been brought to the logic level "L" by the first failure response circuit 121a; and 404 a step, carried out when the result of this determining step is YES, of canceling the first error output ER1 generated in step 402. If in the determining step 401 the second monitor signal MN2 is at the logic level "L", processing moves to a step 440, which will be further discussed later, so that diagnosis of the first and second watchdog timers 120a, 120b is not carried out.

And when in the determining step 403 the first monitor signal MN1 has not been brought to the logic level "L", because this means that the first failure response circuit 121a is defective, in a step 412, which will be further discussed later, the actions of the error output ER and the first error output ER1 are stored, and this stored state is held until the power supply is cut off.

The block of steps 414 made up of steps 402, 403 and 404 constitutes first checking means, for checking the operation of the first failure response circuit 121a.

The reference number 405 denotes a step, carried out after step 404, of intentionally stopping the first watchdog clearing signal WD1 or making its pulse duration exceed a predetermined value, and in this step a normal pulse series continues to be generated as the second watchdog clearing signal WD2.

The reference number 406 denotes a step, carried out after step 405, of driving a determination timer; this determination timer is programmed in software to show "time up" when a time T0 slightly longer than the maximum allowed value of the pulse width of the first and second watchdog clearing signals WD1 and WD2 has elapsed.

The reference number 407 denotes a step, carried out after this step 406, of determining whether or not the determination timer has reached "time up"; and 408 is a step, carried out when the determination of this determining step is that the timer has not yet reached "time up", of determining whether or not the first monitor signal MN1 is at the logic level "L". When the result of this determining step 408 is NO, processing returns to step 405, and steps 405 through 408 are repeated.

If step 407 determines "time up" in the course of this repeating operation, processing proceeds to step 412 and generates and stores the error output ER and the first error output ER1.

And when in step 408 a YES determination is made before step 407 calls "time up", processing proceeds to step 409 and in this step the drive of the determination timer started in step 406 is canceled.

The reference number 410 denotes a step, carried out after step 409, of normalizing the first watchdog clearing signal WD1, which was intentionally rendered abnormal in step 405, and generating the monitor resetting signal output MNR; and 411 is a step, carried out after step 410, of determining whether or not the first monitor signal MN1 has returned to the logic level "H". When the result of step 411is NO, processing proceeds to step 412 and generates and stores the error output ER and the first error output ER1.

The reference number 413 denotes a block of steps made up of steps 401 through 412, and this block of steps 413 constitutes first failure diagnosing means, for diagnosing the first watchdog timer 120a.

The reference number 421 denotes a step, carried out when the result of the determination step 411 is YES, of determining whether or not the first monitor signal MN1 is at the logic level "L"; 422 a step, carried out when the result of this determining step 421 is NO, of generating (bringing to the logic level "H") the second error output ER2; 423 a step, carried out after step 422, of determining whether or not the second monitor signal MN2 has been brought to the logic level "L" by the second failure response circuit 121b; and 424 a step, carried out when the result of this determining step 423 is YES, of canceling the second error output ER2 generated in step 422. If in the determining step 421 the first monitor signal MN1 is at the logic level "L", processing proceeds to a step 440, which will be further discussed later, so that diagnosing of the second watchdog timer 120b is not carried out.

And when in the determining step 423 the second monitor signal MN2 is not at the logic level "L", because this means that the second failure response circuit 121b is defective, in a step 432, which will be further discussed later, the actions of the error output ER and the second error output ER2 are stored, and this stored state is held until the power supply is cut off.

The block of steps 434 made up of steps 422, 423 and 424 constitutes second checking means, for checking the operation of the second failure response circuit 121b.

The reference number 425 denotes a step, carried out after step 424, of intentionally stopping the second watchdog clearing signal WD2 or making its pulse duration exceed a predetermined value, and in this step a normal pulse series continues to be generated as the first watchdog clearing signal WD1.

The reference number 426 denotes a step, carried out after step 425, of driving a determination timer; this determination timer is programmed in software to show "time up" when a time T0 slightly longer than the maximum allowed value of the pulse width of the first and second watchdog clearing signals WD1 and WD2 has elapsed.

The reference number 427 denotes a step, carried out after this step 426, of determining whether or not the determination timer has reached "time up"; and 428 is a step, carried out when the determination of this determining step is that the timer has not yet reached "time up", of determining whether or not the second monitor signal MN2 is at the logic level "L". When the result of this determining step 428 is NO, processing returns to step 425, and steps 425 through 428 are repeated.

If step 427 determines "time up" in the course of this repeating operation, processing proceeds to step 432 and generates and stores the error output ER and the second error output ER2.

And when in step 428 a YES determination is made before step 427 calls "time up", processing proceeds to step 429 and in this step the drive of the determination timer started in step 426 is canceled.

The reference number 430 denotes a step, carried out after step 429, of normalizing the second watchdog clearing signal WD2, which was intentionally rendered abnormal in step 425, and generating the monitor resetting signal output MNR; and 431 is a step, carried out after step 430, of determining whether or not the second monitor signal MN2 has returned to the logic level "H". When the result of step 431 is NO, processing proceeds to step 432 and generates and stores the error output ER and the second error output ER2.

The reference number 433 denotes a block of steps made up of steps 421 through 432, and this block of steps 433 constitutes second failure diagnosing means, for diagnosing the second watchdog timer 120b.

The reference number 440 denotes a step, carried out when the determination of step 401 or step 421 is YES or carried out after step 412 or step 432, of returning the first and second watchdog clearing signals WD1 and WD2 to normal outputs; and 441 is a diagnosis ending step, carried out after step 440. When failure diagnosis of the first and second watchdog timers 120*a*, 120*h* is completed like this, after a suitable time, processing returns again to step 400.

Now that an operation description based on FIGS. 3(*a*) though 3(*n*) and FIG. 4 has been given, the operation of the main parts shown in FIG. 1 will be briefly explained again.

The pair of watchdog timers 120*a*, 120*b* monitor the pulse widths of the pair of watchdog clearing signals WD1, WD2 generated by the microprocessor 101, and when the pulse width of either of the first and second watchdog clearing signals WD1 and WD2 exceeds a predetermined value the respective timer 120*a* or 120*b* generates a reset signal and this reset signal is inputted to the microprocessor 101 as a first or second monitor signal MN1 or MN2.

The reset signals are connected to a reset input terminal (RST) of the microprocessor 101 by the logical connector circuit 122, and when both the first reset signal and the second reset signal are at the logic level "L", an effective resetting signal output is supplied to the microprocessor 101 and resets the microprocessor 101 before being automatically canceled by the one-shot timer 123.

Accordingly, when for the purpose of diagnosis one of the watchdog timers is caused to generate its reset signal, as long as the other watchdog timer does not also generate its reset signal, the effective resetting signal output is not produced. Consequently, it is possible to carry out a diagnosis of each of the watchdog timers in turn.

If a diagnosis result is that one of the watchdog timers is failing passively (i.e. is not producing a reset signal when in fact it should), because in this state an effective resetting signal output cannot be generated, the measure is taken that the reset signal of that watchdog timer is forcibly brought to the logic level "L" by the respective failure response circuit 121*a* or 121*b*, and as a result the reset signal of the other watchdog timer becomes effective on its own.

With respect to the logical connector circuit 122, on the other hand, because a diagnosis operation cannot be carried out on it while it is operating, an operation check is carried out on starting, after the power supply is turned on.

That is, first and second starting circuits 125*a*, 125*b* are for resetting the microprocessor 101 by way of the logical connector circuit 122 if either of the first and second watchdog timers 120*a*, 120*b* should fail passively (logic level "H"), but if the logical connector circuit 122 has failed and its output does not assume the logic level "L", the one-shot timer 123 is not activated and the reset completion memory device 125 will not be reset.

As a result, because the load power supply relay 113 will not operate, safety is ensured, and it can be easily determined that a failure has occurred.

It will now be supposed that during normal operation the microprocessor 101 becomes temporarily abnormal due to a noise malfunction or the like. In this case, one or both of the first and second watchdog timers 120*a*, 120*b* generates a reset signal and the microprocessor 101 stops, and the reset signal or signals are soon canceled by the one-shot timer 123.

The reset completion memory device 125 is temporarily reset by the rise pulse generating circuit 127 when the microprocessor 101 is reset, but because it is set again by the one-shot timer 123 along with completion of the resetting of the microprocessor 101, the load power supply relay 113 is also enabled.

Thus, in the case of an engine control unit for an automotive vehicle, in most cases normal operation is restored before the driver becomes aware of the problem.

However, because if the effective resetting signal output is generated even once the failure occurrence memory device 129 is set by the rise pulse generating circuit 127, and it is also set by the generation of the error output ER, the warning/display device 5 operates along with this and the driving of specified electrical loads is stopped by the interlock signal ITL, and until the power supply switch 2 is turned on again this state is maintained and the driver is informed of the abnormality.

The specified electrical loads referred to here are for example mode-switching signal outputs or actuators for effecting convenience functions which relate to safety, such as a car cruise control unit based on electronic throttle control, or forward/side monitoring devices, and these are functions which are rot needed for driving the vehicle.

On the other hand, because basic functions relating to aspects of engine control such as ignition control and fuel injection control and so on need to be maintained as long as possible to enable the driver to get to shelter or home, in this preferred embodiment the vehicle can still be driven even if one of the watchdog timers is abnormal.

[Second Preferred Embodiment]

(1) Detailed Description of Construction of Second Preferred Embodiment

A second preferred embodiment of a microprocessor runaway monitoring circuit according to the invention is shown in FIG. 5. The following description will concentrate on the differences between this circuit and the circuit shown in FIG. 1.

In FIG. 5, the reference number 500 denotes an electronic apparatus such as an engine control unit for use in an automotive vehicle. A second group of electrical loads 7 controlled by a sub-microprocessor 507 via an output interface circuit 505 is connected to this electronic apparatus 500, and a second drive-stopping gate element 506 is connected to some of these second electrical loads.

Also, a second group of input sensors 6 is connected to the sub-microprocessor 507 via an input interface circuit 504.

The sub-microprocessor 507 cooperates with a main microprocessor 501 and undertakes control of auxiliaries. Between them the two microprocessors control all the electrical loads, and they also perform monitoring of some of each other's control functions.

The main microprocessor 501 has a RAM memory 102 and a nonvolatile program memory 503 such as a flash memory. This main microprocessor 501 monitors a watchdog clearing signal WDS generated by the sub-microprocessor 507, and when the pulse width of the watchdog clearing signal WDS has risen above a predetermined value the main microprocessor 501 generates a resetting signal output (RSTS), at the logic level "L", which restarts the sub-microprocessor 507.

The sub-microprocessor 507 is also reset at the same time as the main microprocessor 501 is reset, by the outputs of first and second logical connector circuits 522*a*, 522*b*.

The reference number 508 denotes a rise pulse generating circuit for generating a short rise pulse when the resetting signal output (RSTS) changes from the logic level "H" to the logic level "L", and 509 is a logical connector circuit for outputting the logical OR of the pulse generated by the pulse generating circuit 508 and an error output ER generated by the main microprocessor 501. This logical connector circuit generates a resultant error output ER0 which sets a failure occurrence memory device 129.

The reference numerals 520a and 520b denote first and second watchdog timers, and because as will be discussed in detail with reference to FIG. 6 these watchdog timers each have a self-resetting circuit 630, the one-shot timer 123 and the monitor resetting signal MNR in FIG. 1 are unnecessary, and the reset completion memory device 125 is set by first and second watchdog timer reset signals WDR1, WDR2 generated by the first and second watchdog timers 520a and 520b.

Also, instead of the logical connector circuit 122 in FIG. 1, a pair of logical connector circuits 522a and 522b, each of which consists of a logical connector element, are connected in parallel to form a duplexed logical connector circuit.

FIG. 6 is a detailed circuit diagram of either of the watchdog timers shown in FIG. 5.

In FIG. 6, the reference number 520 denotes a watchdog timer representing the first watchdog timer 520a or the second watchdog timer 520b; WDn is a watchdog clearing signal representing the first watchdog clearing signal WD1 or the second watchdog clearing signal WD2; MNn is a reset signal (monitor signal) representing the first reset signal (first monitor signal) MN1 or the second reset signal (second monitor signal) MN2; and WDn is a watchdog timer resetting signal representing the first watchdog timer resetting signal WDR1 or the second watchdog timer resetting signal WDR2. The watchdog timers 520a, 520b are each made up of the self-resetting circuit 630 mentioned above and a timer circuit part 120c substantially the same as the watchdog timer 120 in FIG. 2.

The timer circuit part 120c is exactly the same as that shown in FIG. 2 except for the difference that the setting input signal of the flip-flop device 208 (608) is supplied from the self-resetting circuit 630.

In the self-resetting circuit 630, the reference number 631 denotes a comparator which generates the watchdog timer resetting signal WDRn and sets the flip-flop device 608, which is equivalent to the flip-flop device 208, and the reset completion memory device 125 in FIG. 5; 201a and 201b are positive and negative control power supply lines; 632a is a charging resistance for charging a capacitor 632b; and 633a, 633b are voltage-dividing resistances. The charging resistance 632a and the capacitor 632b are connected in series between the power supply lines 201a and 201b, and so are the voltage-dividing resistances 633a, 633b.

The non-inverting input of the comparator 631 is connected to a connection point between the charging resistance 632a and the capacitor 632b; the inverting input of the comparator 631 is connected to a connection point between the voltage-dividing resistances 633a and 633b; and the flip-flop device 608 is set when the charging voltage of the capacitor 632b rises above the division voltage of the voltage-dividing resistances 633a and 633b.

The reference number 634 denotes an output-inverting element for discharging the charge on the capacitor 632b, and 635 is a charging resistance, with a parallel diode 636, for charging a capacitor 637. When the "set" output of the flip-flop device 608 assumes the logic level "H", the capacitor 637 is charged by way of the charging resistance 635, and when this charge voltage rises above a predetermined value the output of the output-inverting element 634 assumes the logic level "L" and the charge voltage of the capacitor 632b discharges and the output of the comparator 631 falls to the logic level "L".

When on the other hand the "set" output of the flip-flop device 608 assumes the logic level "L", the charge voltage of the capacitor 637 is swiftly discharged through the parallel diode 636 and the output of the output-inverting element 634 rises to the logic level "H" and charging of the capacitor 632b begins.

To summarize the overall construction of the watchdog timer 520, the flip-flop device 608 is set by the capacitor 209a when the power supply is switched on and reset by the comparator 200 when during operation the watchdog clearing signal WDn becomes abnormal, whereupon its "set" output assumes the logic level "L" and this becomes the monitor signal MNn.

When the "set" output MNn of the flip-flop device 608 assumes the logic level "L", charging of the capacitor 632b starts immediately, and after a predetermined time T1 the flip-flop device 608 is set by the watchdog timer resetting signal WDRn of the comparator 631 and the logic level of the monitor signal MNn returns to "H".

When the "set" output of the flip-flop device 608 assumes the logic level "H", charging of the capacitor 637 begins, and after a predetermined time t3 the output of the output-inverting element 634 falls to the logic level "L" and the output WDRn of the comparator 631 falls to the logic level "L", and the setting input of the flip-flop device 608 is canceled.

The timing relationship described above is the same as that shown in FIG. 3H.

(2) Detailed Description of Operation of Second Preferred Embodiment

In the electronic apparatus 500 shown in FIG. 5, the operation of the runaway monitoring circuit based on the pair of watchdog timers 520a, 520b and the logical connector circuits 522a, 522b itself is effectively the same as that shown in FIG. 1.

However, because the one-shot timer 123 in FIG. 1 is built into each of the watchdog timers 520a and 520b, more of the circuitry is duplexed and reliability is improved.

That is, in the circuit shown in FIG. 1 there is the issue that if the one-shot timer 123 becomes abnormal, both the first and second watchdog timers 120a, 120h either will not be reset or will be reset persistently.

With the construction shown in FIG. 5, on the other hand, even if one of the self-resetting circuits 630 becomes abnormal, the other watchdog timer still functions effectively.

And because the logical connector circuits 522a, 522b are also duplexed, although the overall number of circuit parts has increased, the circuit shown in FIG. 5 has a higher reliability than that of FIG. 1.

Because the watchdog timers have built-in self-resetting functions, the main microprocessor 501 does not generate a monitor resetting signal output MNR.

Explaining the operation of the main microprocessor 501 with reference to FIG. 4, in step 410 and step 430 of FIG. 4, instead of generating an MNR output, the main microprocessor 501 stands by until the respective self-resetting circuit 630 self-resets the respective watchdog timer 520a or 520b, and then proceeds to the next step.

The rest of the operation flow is the same as that shown in FIG. 4.

The sub-microprocessor 507 cooperating with the main microprocessor 501 controls the second electrical loads 7 in accordance with a control program (not shown). Its watchdog clearing signal WDS is monitored by runaway monitoring means built in to the nonvolatile program memory 503 of the main microprocessor 501, and when there is an isolated abnormality of the sub-microprocessor 507 alone it is reset by the main microprocessor 501.

However, when the main microprocessor 501 is abnormal, even if the sub-microprocessor 507 is normal, the main microprocessor 501 and the sub-microprocessor 507 are both reset by the first and second watchdog timers 520a and 520b.

In the case of an isolated abnormality of the sub-microprocessor 507, the abnormality is recorded by the failure occurrence memory device 129, and the interlock signal ITL and the warning/display device 5 both operate.

This failure occurrence memory device 129 also records the error output ER generated by the main microprocessor 501 and the action of the effective resetting signal output produced by the first and second watchdog timers 520a and 520b, and the interlock signal ITL change which accompanies this recording of an abnormality stops the driving of not only those of the electrical loads 4 which are controlled by the drive-stopping gate element but also those of the second electrical loads 7 which are controlled by the second drive-stopping gate element 506.

The second electrical loads 7 are supplied with power from the power supply 1 via the output contacts 114 of the load power supply relay 113.

[Third Preferred Embodiment]

(1) Detailed Description of Construction of Third Preferred Embodiment

A block diagram of a third preferred embodiment of a microprocessor runaway monitoring control circuit according to the invention is shown in FIG. 7. The following description will concentrate on the differences between this circuit and the circuit shown in FIG. 1.

In FIG. 7, the reference number 700 denotes an electronic apparatus such as an engine control unit for use in an automotive vehicle. This electronic apparatus is controlled by a microprocessor 701 having a RAM memory 102 for computational processing use and a nonvolatile program memory 703 such as a flash memory. As in the case shown in FIG. 1, first and second watchdog clearing signals WD1 and WD2 generated by this microprocessor 701 are respectively monitored by first and second watchdog timers 120a and 120b, and first and second reset signals generated by these first and second watchdog timers 120a, 120b are inputted to the microprocessor 701 as first and second monitoring signals MN1, MN2.

The reference numeral 721a denotes a first gate element which outputs the logical OR of the first reset signal generated by the first watchdog timer 120a and a first test output TST1 generated by the microprocessor 701; 721b a second gate element which outputs the logical OR of the second reset signal generated by the second watchdog timer 120b and a second test output TST2 generated by the microprocessor 701; and 722 a failure response circuit which generates a NOT output of the logical AND of the first and second test outputs TST1 and TST2. The outputs of the first and second gate elements 721a, 721b and the output of the failure response circuit 722 are connected in a wired OR and fed to a reset input (RST) of the microprocessor 701.

The first and second gate elements 721a, 721b and the output part of the failure response circuit 722 are made up of NPN transistors having collector resistances serving as pull-up resistances, and are of a circuit type such that their outputs can be directly connected together.

The reference numerals 725a, 725b denote first and second starting circuits, each consisting of an inverting logical element, connected between the "reset" output of the reset completion memory device 125 and the first and second watchdog timers 120a, 120b. These starting circuits are for resetting the microprocessor 701 by way of the first gate element 721a or the second gate element 721b on starting, when the reset completion memory device 125 is undergoing reset, even if the first and second watchdog timers 120a, 120b are both failing passively.

The failure response circuit 722 resets the microprocessor 701 if the first and second test outputs TST1, TST2 generated by the microprocessor 701 are both at the logic level "H".

(2) Detailed Description of Operation of Third Preferred Embodiment

FIG. 8 is a flow chart illustrating the operation of failure diagnosing means in the circuit shown in FIG. 7.

In FIG. 8, the reference number 800 denotes a diagnosis start step; 801a step, carried out after step 800, of determining whether or not an abnormality detection flag has been set in a step 821 which will be further discussed later; and 802 a step, carried out when the determination of step 801 is NO, of generating the first test output TST1 and intentionally stopping the first watchdog clearing signal WD1 or raising its pulse width to above a predetermined value. In this step, the second watchdog clearing signal WD2 continues to be generated as a normal pulse.

The reference number 803 denotes a step, carried out after step 802, of driving a determination timer. This determination timer is programmed in software to reach "time up" when a time T0 slightly longer than the maximum allowed value of the pulse width of the first and second watchdog clearing signals WD1 and WD2 has elapsed.

The reference number 804 denotes a step, carried out after step 803, of determining whether or not the determination timer has reached "time up"; and 805 is a step, carried out when the determination of this determining step is that the timer has not yet reached "time up", of determining whether or not the first monitor signal MN1 is at the logic level "L". If the result of this determining step 805 is NO, processing returns to step 802, and steps 802 through 805 are repeated.

If step 804 determines "time up" in the course of this repeating operation, processing proceeds to step 821 and generates and stores the error output ER and an error flag FLAG.

When in step 805 a YES determination is made before step 804 calls "time up", processing proceeds to step 806 and in this step the drive of the determination timer started in step 803 is canceled and the monitor resetting signal output MNR is generated and the first watchdog timer 120a is reset.

A YES determination being made in step 805 means that the first watchdog timer 120a has operated and the first reset signal, i.e. the first monitor signal MN1, has assumed the logic level "L". At this point, because the first test output TST1 is at the logic level "H", the effective resetting signal output (RST) is not generated as a result of the action of the first gate element 721a in FIG. 7, and the watchdog timer being tested is cut off.

The reference number 807 denotes a step, carried out after step 806, of determining whether or not the first monitor signal MN1 has returned to the logic level "H", and when this determination is NO then processing proceeds to step 821 and generates and stores the error output ER and the error flag FLAG.

The reference number 808 denotes a step, carried out when the determination of step 807 is YES, of normalizing the first watchdog clearing signal WD1, which was intentionally rendered abnormal in step 802, and canceling the first test output TST1 by bringing it to the logic level "L".

The reference number 809 denotes a block of steps made up of steps 802 through 808, and this block 809 constitutes first failure diagnosing means for diagnosing the first watchdog timer 120*a*.

The reference number 812 denotes a step, carried out after step 808, of generating the second test output TST2 and intentionally stopping the second watchdog clearing signal WD2 or raising its pulse width to above a predetermined value. In this step, the first watchdog clearing signal WD1 continues to be generated as a normal pulse.

The reference number 813 denotes a step, carried out after step 812, of driving a determination timer. This determination timer is programmed in software to reach "time up" when a time T0 slightly longer than the maximum allowed value of the pulse width of the first and second watchdog clearing signals WD1 and WD2 has elapsed.

The reference number 814 denotes a step, carried out after step 813, of determining whether or not the determination timer has reached "time up"; and 815 is a step, carried out when the determination of this determining step is that the timer has not yet reached "time up", of determining whether or not the second monitor signal MN2 is at the logic level "L". If the result of this determining step 815*is* NO, processing returns to step 812, and steps 812 through 815 are repeated.

If step 814 determines "time up" in the course of this repeating operation, processing proceeds to step 821 and generates and stores the error output ER and the error flag FLAG.

And when in step 815 a YES determination is made before step 814 calls "time up", processing proceeds to step 816 and in this step the drive of the determination timer started in step 813 is canceled and the monitor resetting signal output MNR is generated and the second watchdog timer 120*b* is reset.

A YES determination being made in step 815 means that the second watchdog timer 120*b* has operated and the second reset signal, i.e. the second monitor signal MN2, has assumed the logic level "L". At this point, because the second test output TST2 is at the logic level "1", the effective resetting signal output (RST) is not generated as a result of the action of the second gate element 721*b* in FIG. 7, and the watchdog timer being tested is cut off.

The reference number 817 denotes a step, carried out after step 816, of determining whether or not the second monitor signal MN2 has returned to the logic level "H", and when this determination is NO then processing proceeds to step 821 and generates and stores the error output ER and the error flag FLAG.

The reference number 818 denotes a step, carried out when the determination of step 817 is YES, of normalizing the second watchdog clearing signal WD2, which was intentionally rendered abnormal in step 812, and canceling the second test output TST2 by bringing it to the logic level "L".

The reference number 819 denotes a block of steps made up of steps 812 through 818, and this block 819 constitutes second failure diagnosing means for diagnosing the second watchdog timer 120*b*.

The reference number 821 denotes the step, carried out when an abnormality is determined in any of the determining steps 804, 807, 814 and 817, of generating and storing the error output ER and the error flag FLAG; 822 is a step of normalizing the first and second watchdog clearing signal WD1 or WD2 intentionally rendered abnormal in step 802 or step 812; and 823 is a diagnosis ending step, carried out when the determination of step 801 is YES or carried out after step 818 or step 822. When failure diagnosis of the first and second watchdog timers 120*a*, 120*b* has been completed in this way, after a suitable interval processing returns to the diagnosis start step 800.

When processing jumps from step 807 or step 817 to step 821, the respective test output TST1 or TST2 remains at the logic level "H", and with respect to active failure of the respective watchdog timer 120*a* or 120*b* an unnecessary effective resetting signal output is not generated.

Now that an operation description based on FIG. 8 has been given, the operation of the main parts of the circuit shown in FIG. 7 will be briefly explained again.

The pair of watchdog timers 120*a*, 120*b* monitor the pulse widths of the pair of watchdog clearing signals WD1, WD2 generated by the microprocessor 701, and when the pulse width of either of the first and second watchdog clearing signals WD1 and WD2 exceeds a predetermined value the respective timer 120*a* or 120*b* generates a reset signal and this reset signal is inputted to the microprocessor 701 as a first or second monitor signal MN1 or MN2.

The reset signals are connected to a reset input terminal of the microprocessor 701 by way of the first and second gate elements 721*a* and 721*b*, and when either of the reset signals is at the logic level "L" an effective resetting signal output is supplied to the microprocessor 701 and resets the microprocessor 701 before being automatically canceled by the one-shot timer 123.

However, when either of the first and second test outputs TST1, TST2 is at the logic level "H", the effective resetting signal output is not generated by the operation of the respective first or second gate element 721*a*, 721*b*.

Accordingly, when for the purpose of diagnosis one of the watchdog timers is caused to generate its reset signal, as long as the other watchdog timer does not also generate its reset signal, the effective resetting signal output is not produced. Consequently, it is possible to carry out a diagnosis of each of the watchdog timers in turn.

If a diagnosis result is that one of the watchdog timers is failing passively (i.e. is not producing a reset signal when in fact it should), the reset signal of the other watchdog timer is still effective. And if during a diagnosis operation an active failure arises (that is, the respective watchdog timer produces a reset signal when in fact it should not), the respective test output is not canceled, and the abnormal watchdog timer is thereby cut off.

The failure response circuit 722, when due to an abnormality of the microprocessor 701 or the like the first and second test outputs TST1, TST2 have both assumed the logic level "H", generates an effective resetting signal output and resets the microprocessor 701.

The first and second starting circuits 725*a*, 725*b* are for resetting the microprocessor 701 by way of the first and second gate elements 721*a*, 721*b* if both of watchdog timers 120*a*, 120*b* should fail passively (logic level "H"), but if both of the first and second gate elements 721*a*, 721*b* have failed and their outputs do not assume the logic level "L", the one-shot timer 123 is not activated and the reset completion memory device 125 will not be reset.

As a result, because the load power supply relay 113 will not operate, safety is ensured, and it can be easily determined that a failure has occurred.

It will now be supposed that during normal operation the microprocessor 701 has become temporarily abnormal due to a noise malfunction or the like. In this case, one or both of the first and second watchdog timers 120*a*, 120*b* generates a reset signal and the microprocessor 701 stops, and the reset signal or signals are then canceled by the one-shot timer 123.

The reset completion memory device 125 is temporarily reset by the rise pulse generating circuit 127 when the microprocessor 701 is reset, but because it is set again by the one-shot timer 123 along with completion of the resetting of the microprocessor 701, the load power supply relay 113 also becomes enabled.

Thus, in the case of an engine control unit for an automotive vehicle, in most cases, normal operation is restored before the driver becomes aware of the problem.

However, because if the effective resetting signal output is generated even once the failure occurrence memory device 129 is set by the rise pulse generating circuit 127, and it is also set by the generation of the error output ER, the warning/display device 5 operates along with this and the driving of specified electrical loads is stopped by the interlock signal ITL, and until the power supply switch 2 is turned on again this state is maintained and the driver is informed of the abnormality.

The specified electrical loads referred to here are for example mode-switching signal outputs or actuators for effecting convenience functions which relate to safety, such as a car cruise control unit based on electronic throttle control, or forward/side monitoring devices, and these are functions which are not needed for driving the vehicle.

On the other hand, because basic functions relating to aspects of engine control such as ignition control and fuel injection control and so on need to be maintained as long as possible to enable the driver to get to shelter or home, in this preferred embodiment the vehicle can still be driven even if there is a temporary microprocessor abnormality.

[Fourth Preferred Embodiment]

(1) Detailed Description of Construction of Fourth Preferred Embodiment

A block diagram of a fourth preferred embodiment of a microprocessor runaway monitoring control circuit according to the invention is shown in FIG. 9. The following description will concentrate on the differences between this circuit and the circuit shown in FIG. 7.

In FIG. 9, the reference numeral 900 denotes an electronic apparatus such as an engine control unit for use in an automotive vehicle, and this electronic apparatus has a sub-microprocessor 907 to which are connected a second group of electrical loads and a second group of input sensors (not shown).

The sub-microprocessor 907 cooperates with a main microprocessor 901 and undertakes control of auxiliaries. Between them the two microprocessors control all the electrical loads, and they also perform monitoring of some of each other's control functions.

The main microprocessor 901 has a RAM memory 102 and a nonvolatile program memory 903 such as a flash memory. This main microprocessor 901 monitors a watchdog clearing signal WDS generated by the sub-microprocessor 907, and when the pulse width of the watchdog clearing signal WDS has risen above a predetermined value the main microprocessor 901 generates a resetting signal output (RSTS), at the logic level "L", which restarts the sub-microprocessor 907.

The program memory 903 holds runaway monitoring means for monitoring the watchdog clearing signal WDS from the sub-microprocessor 907, and first and second failure diagnosing means for diagnosing failures of first and second watchdog timers 520*a*, 520*b*.

The sub-microprocessor 907 is also reset at the same time as the main microprocessor 901 is reset, by the outputs of first and second gate elements 721*a*, 721*b*.

The reference number 508 denotes a rise pulse generating circuit for generating a short rise pulse when the resetting signal output (RSTS) changes from the logic level "H" to the logic level "L", and 509 is a logical connector circuit for outputting the logical OR of the pulse generated by the pulse generating circuit 508 and an error output ER generated by the main microprocessor 901. This logical connector circuit generates a resultant error output ER0 which sets a failure occurrence memory device 129.

The reference numerals 520*a* and 520*b* denote first and second watchdog timers, and because these watchdog timers each have a built-in self-resetting circuit 630 as described in detail with reference to FIG. 6, the one-shot timer 123 and the monitor resetting signal MNR in FIG. 7 are unnecessary, and the reset completion memory device 125 is set by first and second watchdog timer reset signals WDR1, WDR2 generated by the first and second watchdog timers 520*a* and 520*b*.

The sub-microprocessor 907 is connected in the way shown in FIG. 5 to a second group of input sensors and a second group of electrical loads; the second electrical loads are supplied with power via the output contacts 114 of the load power supply relay 113; and drive-stopping gate elements are provided for some of the loads as necessary and controlled by an interlock signal ITL generated by the failure occurrence memory device 129.

(2) Detailed Description of Operation of Fourth Preferred Embodiment

In the electronic apparatus 900 shown in FIG. 9, the operation of the runaway monitoring circuit based on the pair of watchdog timers 520*a*, 520*b* and the first and second gate elements 721*a*, 721*b* itself is effectively the same as that shown in FIG. 7.

However, because the one-shot timer 123 in FIG. 7 is built into each of the watchdog timers 520*a* and 520*b*, more of the circuitry is duplexed and reliability is improved.

That is, in the circuit shown in FIG. 7 there is the issue that when the one-shot timer 123 is abnormal, both the first and second watchdog timers 120*a*, 120*b* either will not be reset or will be reset persistently.

With the construction shown in FIG. 9, on the other hand, even if one of the self-resetting circuits 630 becomes abnormal, the other watchdog timer still functions effectively.

As a result, although the overall number of circuit parts has increased, the circuit shown in FIG. 9 has a higher reliability than that of FIG. 7.

Because the watchdog timers have the built-in self-resetting circuits 630, the main microprocessor 901 does not generate a monitor resetting signal output MNR.

Explaining the operation of the main microprocessor 901 with reference to FIG. 8, in step 806 and step 816 of FIG.

8, instead of generating an MNR output, the main microprocessor 901 stands by until the respective self-resetting circuit 630 self-resets the respective watchdog timer 520a or 520b, and then proceeds to the next step.

The rest of the operation flow is the same as that shown in FIG. 8.

The sub-microprocessor 907 cooperating with the main microprocessor 901 controls the second electrical loads in accordance with a control program (not shown). Its watchdog clearing signal WDS is monitored by the main microprocessor 901, and when there is an isolated abnormality of the sub-microprocessor 907 alone it is reset by the main microprocessor 901.

However, when the main microprocessor 901 is abnormal, even if the sub-microprocessor 907 is normal, the main microprocessor 901 and the sub-microprocessor 907 are both reset by the first and second watchdog timers 520a and 520b.

In the case of an isolated abnormality of the sub-microprocessor 907, the abnormality is recorded by the failure occurrence memory device 129, and the interlock signal ITL and the warning/display device 5 both operate.

This failure occurrence memory device 129 also records the error output ER generated by the main microprocessor 901 and the action of the effective resetting signal output produced by the first and second watchdog timers 520a and 520b, and the interlock signal ITL change which accompanies this recording of an abnormality stops the driving of not only some of the electrical loads 4 but also, as necessary, some of the second electrical loads (not shown).

[Fifth Preferred Embodiment]

A block diagram of a fifth preferred embodiment of a microprocessor runaway monitoring control circuit according to the invention is shown in FIG. 10. The following description will concentrate on the differences between this circuit and the circuit shown in FIG. 5.

In FIG. 10, the reference number 1000 denotes an electronic apparatus such as an engine control unit for use in an automotive vehicle. This electronic apparatus has a main microprocessor 1001 with a RAM memory 102 for computational processing use and a nonvolatile program memory 1003a such as a flash memory, and a sub-microprocessor 1007 with a RAM memory 1002 for computational processing use and a nonvolatile program memory 1003b such as a flash memory. In the same way as that shown in FIG. 5, a second group of electrical loads and a second group of sensors (not shown) are connected to the sub-microprocessor by way of an output interface circuit and an input interface circuit (not shown) respectively, and a second drive-stopping gate element similar to that shown in FIG. 5 is connected to some of these second electrical loads.

The sub-microprocessor 1007 cooperates with the main microprocessor 1001 and undertakes control of auxiliaries. Between them the two microprocessors control all the electrical loads, and they also perform monitoring of some of each other's control functions.

The program memory 1003a holds a program serving as runaway monitoring means for the sub-microprocessor 1007, in addition to programs for controlling the electrical loads 4. The main microprocessor 1001 monitors the watchdog clearing signal WDS generated by the sub-microprocessor 1007, and when the pulse width of the watchdog clearing signal WDS has risen above a predetermined value the main microprocessor 1001 generates a resetting signal output (RSTS), at the logic level "L", which restarts the sub-microprocessor 1007.

The most important point of difference between the circuits shown in FIG. 10 and FIG. 5 is that the second watchdog timer 520b in FIG. 10 is provided in the form of software inside the sub-microprocessor 1007.

That is, the program memory 1003b holds a program serving as watchdog monitoring means besides programs for controlling the second electrical loads, and this watchdog monitoring means is for realizing with software the same action as that of the watchdog timer 520 shown in FIG. 6.

Accordingly, the second watchdog clearing signal WD2 generated by the microprocessor 1001 is supplied to the sub-microprocessor 1007 and the sub-microprocessor 1007 generates a second reset signal RST2 and supplies it to the logical connector circuits 522a, 522b via an external connection circuit 1040 consisting of an inverting logical element.

And the sub-microprocessor 1007 generates a second watchdog timer resetting signal WDR2 and sets the reset completion memory device 125 with it.

The reference numeral 1041 denotes a default circuit consisting of a pull-up resistance, and until the sub-microprocessor 1007 is started this default circuit forces the output of the external connection circuit 1040 consisting of an inverting logical element to the logic level "L".

The reference number 1042 also denotes a default circuit, this time consisting of a pull-down resistance, and until the sub-microprocessor 1007 is started this default circuit forces the second watchdog timer resetting signal WDR2 to the logic level "L" so that the reset completion memory device 125 is not set.

As is clear from the foregoing description, in the electronic apparatus shown in FIG. 10, one of the pair of watchdog timers is replaced by the sub-microprocessor, and a watchdog timer consisting of substituted software, i.e. the watchdog monitoring means held in the program memory 1003b, is diagnosed by second failure diagnosing means inside the program memory 1003a, and in this case the second watchdog clearing signal WD2 supplied to the sub-microprocessor 1007 intentionally is stopped or has its pulse width raised above a predetermined value and an inverted output of a second reset signal RST2 accompanying this is monitored as the second monitor signal MN2 by the microprocessor 1001.

Although the watchdog monitoring means built into the sub-microprocessor 1007 was described as being one with a self-resetting function of the kind shown in FIG. 6, instead of this a watchdog timer of the kind shown in FIG. 2 may be used, and in this case the second watchdog timer 120b shown in FIG. 1 can be realized by the watchdog monitoring means.

[Sixth Preferred Embodiment]

A block diagram of a sixth preferred embodiment of a microprocessor runaway monitoring control circuit according to the invention is shown in FIG. 11. The following description will concentrate on the differences between this circuit and the circuit shown in FIG. 9.

In FIG. 11, the reference number 1100 denotes an electronic apparatus such as an engine control unit for use in an automotive vehicle. This electronic apparatus has a main microprocessor 1101 with a RAM memory 102 for computational processing use and a nonvolatile program memory 1103a such as a flash memory, and a sub-microprocessor 1107 with a RAM memory 1102 for computational processing use and a nonvolatile program memory 1103b such as a flash memory. In the same way as that shown in FIG. 5, a second group of electrical loads and a second group of sensors (not shown) are connected to the sub-microprocessor by way of an output interface circuit and an input interface circuit (not shown) respectively, and a second drive-stopping gate element similar to that shown in FIG. 5 is connected to some of these second electrical loads.

The sub-microprocessor 1107 cooperates with the main microprocessor 1101 and undertakes control of auxiliaries. Between them the two microprocessors control all the electrical loads, and they also perform monitoring of some of each other's control functions.

The program memory 1103a holds a program serving as runaway monitoring means for the sub-microprocessor 1107, in addition to programs for controlling the electrical loads 4. The main microprocessor 1101 monitors the watchdog clearing signal WDS generated by the sub-microprocessor 1107, and when the pulse width of the watchdog clearing signal WDS has risen above a predetermined value the main microprocessor 1101 generates a resetting signal output (RSTS), at the logic level "L", which restarts the sub-microprocessor 1107.

The most important point of difference between the circuits shown in FIG. 11 and FIG. 9 is that the second watchdog timer 520b in FIG. 11 is provided in the form of software inside the sub-microprocessor 1107.

That is, the program memory 1103b holds a program serving as watchdog monitoring means besides programs for controlling the second electrical loads, and this watchdog monitoring means is for realizing with software the same action as that of the watchdog timer 520 shown in FIG. 6.

Accordingly, the second watchdog clearing signal WD2 generated by the microprocessor 1101 is supplied to the sub-microprocessor 1107 and the sub-microprocessor 1107 generates a second reset signal RST2 and supplies it to the second gate element 721b via an external connection circuit 1140 consisting of an inverting logical element.

And the sub-microprocessor 1107 generates a second watchdog timer resetting signal WDR2 and sets the reset completion memory device 125 with it.

The reference numeral 1141 denotes a default circuit consisting of a pull-down resistance, and until the sub-microprocessor 1107 is started this default circuit forces the output of the external connection circuit 1140 consisting of an inverting logical element to the logic level "H".

The reference number 1142 also denotes a default circuit consisting of a pull-down resistance, and until the sub-microprocessor 1107 is started this default circuit forces the second watchdog timer resetting signal WDR2 to the logic level "L" so that the reset completion memory device 125 is not set.

As is clear from the foregoing description, in the electronic apparatus shown in FIG. 11, one of the pair of watchdog timers is replaced by the sub-microprocessor, and a watchdog timer consisting of substituted software, i.e. the watchdog monitoring means held in the program memory 1103b, is diagnosed by second failure diagnosing means inside the program memory 1103a, and in this case the second watchdog clearing signal WD2 supplied to the sub-microprocessor 1107 intentionally is stopped or has its pulse width raised above a predetermined value and an inverted output of a second reset signal RST2 accompanying this is monitored as the second monitor signal MN2 by the microprocessor 1101.

Although the watchdog monitoring means built into the sub-microprocessor 1107 was described as being one with a self-resetting function of the kind shown in FIG. 6, instead of this a watchdog timer of the kind shown in FIG. 2 may be used, and in this case the second watchdog timer 120b shown in FIG. 7 can be realized by the watchdog monitoring means.

[Seventh Preferred Embodiment]

A block diagram of a seventh preferred embodiment of a microprocessor runaway monitoring control circuit according to the invention is shown in FIG. 12. The following description will concentrate on the differences between this circuit and the circuit shown in FIG. 5.

In FIG. 12, the reference number 1200 denotes an electronic apparatus such as an engine control unit for use in an automotive vehicle. This electronic apparatus has a main microprocessor 1201 with a RAM memory 102 for computational processing use and a nonvolatile program memory 1203a such as a flash memory, and a sub-microprocessor 1207 with a RAM memory 1202 for computational processing use and a nonvolatile program memory 1203b such as a flash memory. In the same way as that shown in FIG. 5, a second group of electrical loads and a second group of sensors (not shown) are connected to the sub-microprocessor by way of an output interface circuit and an input interface circuit (rot shown) respectively, and a second drive-stopping gate element similar to that shown in FIG. 5 is connected to some of these second electrical loads.

The sub-microprocessor 1207 cooperates with the main microprocessor 1201 and undertakes control of auxiliaries. Between them the two microprocessors control all the electrical loads, and they also perform monitoring of some of each other's control functions.

The program memory 1203a holds a program serving as runaway monitoring means for the sub-microprocessor 1207 in addition to programs for controlling the electrical loads 4. The main microprocessor 1201 monitors the watchdog clearing signal WDS generated by the sub-microprocessor 1207, and when the pulse width of the watchdog clearing signal WDS has risen above a predetermined value the main microprocessor 1201 generates a resetting signal output (RSTS), at the logic level "L", which restarts the sub-microprocessor 1207.

The most important point of difference between the circuits shown in FIG. 12 and FIG. 5 is that the second watchdog timer 520b in FIG. 12 is provided in the form of software inside the sub-microprocessor 1207.

That is, the program memory 1203b holds a program serving as watchdog monitoring means besides programs for controlling the second electrical loads, and this watchdog monitoring means is for realizing with software the same action as that of the watchdog timer 520 shown in FIG. 6.

Accordingly, the second watchdog clearing signal WD2 generated by the microprocessor 1201 is supplied to the sub-microprocessor 1207 and the sub-microprocessor 1207 generates a second reset signal RST2 and supplies it to logical connector circuits 522a, 522b via an external connection circuit 1240 consisting of an inverting logical element.

And the sub-microprocessor 1207 generates a second watchdog timer resetting signal WDR2 and sets the reset completion memory device 125 with it.

The reference numeral 1241 denotes a default circuit consisting of a pull-up resistance, and until the sub-microprocessor 1207 is started this default circuit forces the output of the external connection circuit 1240 consisting of an inverting logical element to the logic level "L".

The reference number 1242 also denotes a default circuit, this time consisting of a pull-down resistance, and until the sub-microprocessor 1207 is started this default circuit forces the second watchdog timer resetting signal WDR2 to the logic level "L" so that the reset completion memory device 125 is not set.

As is clear from the foregoing description, in the electronic apparatus shown in FIG. 12, one of the pair of watchdog timers is replaced by the sub-microprocessor, and in this point the apparatus is the same as that shown in FIG. 10. However, the watchdog timer consisting of substituted software, i.e. the watchdog monitoring means held in the program memory 1203*b*, is diagnosed by runaway monitoring means inside the program memory 1203*a*, and the external connection circuits including the inverting logical element 1240 are diagnosed by second failure diagnosing means inside the program memory 1203*a*.

Accordingly, the second watchdog clearing signal WD2 supplied to the sub-microprocessor 1207 is not intentionally stopped or raised in pulse width above a predetermined value by the main microprocessor 1201, and as long as the microprocessor 1201 is normal a normal watchdog clearing signal is supplied.

The diagnosis of the watchdog monitoring means is carried out instead by the runaway monitoring means whereby the microprocessor 1201 monitors the watchdog clearing signal WDS generated by the sub-microprocessor 1207.

And when diagnosing the external connection circuit 1240, the microprocessor 1201 supplies a test mode signal TST to the sub-microprocessor 1207, and the sub-microprocessor 1207 receiving the test mode signal TST forcibly brings the second resetting signal RST2 to the logic level "H" and then after a predetermined time cancels this and generates the second watchdog timer resetting signal WDR2.

In this test mode, if the second monitor signal MN2 assumes the logic level "L" and then soon returns to the logic level "H", then the external connection circuit 1240 is normal.

Accordingly, the second error output ER2 generated by the microprocessor 1201 is the logical OR of the RSTS, which is the logical inversion of the resetting signal output (RSTS), and the result of the diagnosis on the external connection circuit 1240.

Although the watchdog monitoring means built into the sub-microprocessor 1207 was described as being one with a self-resetting function of the kind shown in FIG. 6, instead of this a watchdog timer of the kind shown in FIG. 2 may be used, and in this case the second watchdog timer 120*b* shown in FIG. 1 can be realized by the watchdog monitoring means.

[Eighth Preferred Embodiment]

A block diagram of an eighth preferred embodiment of a microprocessor runaway monitoring control circuit according to the invention is shown in FIG. 13. The following description will concentrate on the differences between this circuit and the circuit shown in FIG. 9.

In FIG. 13, the reference number 1300 denotes an electronic apparatus such as an engine control unit for use in an automotive vehicle. This electronic apparatus has a main microprocessor 1301 with a RAM memory 102 for computational processing use and a nonvolatile program memory 1303*a* such as a flash memory, and a sub-microprocessor 1307 with a RAM memory 1302 for computational processing use and a nonvolatile program memory 1303*b* such as a flash memory. In the same way as that shown in FIG. 5, a second group of electrical loads and a second group of sensors (not shown) are connected to the sub-microprocessor by way of an output interface circuit and an input interface circuit (not shown) respectively, and a second drive-stopping gate element similar to that shown in FIG. 5 is connected to some of these second electrical loads.

The sub-microprocessor 1307 cooperates with the main microprocessor 1301 and undertakes control of auxiliaries. Between them the two microprocessors control all the electrical loads, and they also perform monitoring of some of each other's control functions.

The program memory 1303*a* holds a program serving as runaway monitoring means for the sub-microprocessor 1307, in addition to programs for controlling the electrical loads 4. The main microprocessor 1301 monitors the watchdog clearing signal WDS generated by the sub-microprocessor 1307, and when the pulse width of the watchdog clearing signal WDS has risen above a predetermined value the main microprocessor 1301 generates a resetting signal output (RSTS), at the logic level "L", which restarts the sub-microprocessor 1307.

The most important point of difference between the circuits shown in FIG. 13 and FIG. 9 is that the second watchdog timer 520*b* in FIG. 13 is provided in the form of software inside the sub-microprocessor 1307.

That is, the program memory 1303*b* holds a program serving as watchdog monitoring means besides programs for controlling the second electrical loads, and this watchdog monitoring means is for realizing with software the same action as that of the watchdog timer 520 shown in FIG. 6.

Accordingly, the second watchdog clearing signal WD2 generated by the microprocessor 1301 is supplied to the sub-microprocessor 1307 and the sub-microprocessor 1307 generates a second reset signal RST2 and supplies it to a second gate element 721*b* via an external connection circuit 1340 consisting of an inverting logical element.

And the sub-microprocessor 1307 generates a second watchdog timer resetting signal WDR2 and sets the reset completion memory device 125 with it.

The reference numeral 1341 denotes a default circuit consisting of a pull-down resistance, and until the sub-microprocessor 1307 is started this default circuit forces the output of the external connection circuit 1340 consisting of an inverting logical element to the logic level "H".

The reference number 1342 also denotes a default circuit consisting of a pull-down resistance, and until the sub-microprocessor 1307 is started this default circuit forces the second watchdog timer resetting signal WDR2 to the logic level "L" so that the reset completion memory device 125 is not set.

As is clear from the foregoing description, in the electronic apparatus shown in FIG. 13, one of the pair of watchdog timers is replaced by the sub-microprocessor, and in this point the apparatus is the same as that shown in FIG. 11.

However, the watchdog timer consisting of substituted software, i.e. the watchdog monitoring means held in the program memory 1303*b*, is diagnosed by runaway monitoring means inside the program memory 1303*a*, and the external connection circuits including the inverting logical element 1340 are diagnosed by second failure diagnosing means inside the program memory 1303*a*.

Accordingly, the second watchdog clearing signal WD2 supplied to the sub-microprocessor 1307 is not intentionally stopped or raised in pulse width above a predetermined value by the main microprocessor 1301, and as long as the microprocessor 1301, is normal a normal watchdog clearing signal is supplied.

The diagnosis of the watchdog monitoring means is carried out instead by the runaway monitoring means whereby the microprocessor 1301 monitors the watchdog clearing signal WDS generated by the sub-microprocessor 1307.

And when diagnosing the external connection circuit 1340, the microprocessor 1301 supplies a test mode signal TST to the sub-microprocessor 1307, and the sub-microprocessor 1307 receiving the test mode signal TST forcibly brings the second resetting signal RST2 to the logic level "H" and then after a predetermined time cancels this and generates the second watchdog timer resetting signal WDR2.

In this test mode, if the second monitor signal MN2 assumes the logic level "L" and then soon returns to the logic level "H", then the external connection circuit 1340 is normal.

Accordingly, the error output ER generated by the microprocessor 1301 is the logical OR of the RSTS, which is the logical inversion of the resetting signal (RSTS), the result of the diagnosis on the external connection circuit 1340, and the result of the diagnosis on the first watchdog timer 520*a*, and the resetting signal (RSTS) is also OR-ed by the inverting logical element 509.

Although the watchdog monitoring means built into the sub-microprocessor 1307 was described as being one with a self-resetting function of the kind shown in FIG. 6, instead of this a watchdog timer of the kind shown in FIG. 2 may be used, and in this case the second watchdog timer 120*b* shown in FIG. 7 can be realized by the watchdog monitoring means.

[Ninth Preferred Embodiment]

The preferred embodiments described above are based on first and second approaches wherein an effective resetting signal output is obtained respectively as the logical OR and the logical AND of a pair of reset signals generated by a pair of watchdog timers, with variations according to whether or not the watchdog timers include self-resetting functions and whether or not there is a cooperating sub-microprocessor.

In all of these cases, one of the watchdog timers is diagnosed while the other watchdog timer monitors the microprocessor. The main differences between the first and second approaches can be summarized as follows.

Whereas with the first approach operation of the apparatus can continue as long as the pair of watchdog timers are not both failing actively, with the second approach the apparatus cannot function if either one of the watchdog timers is failing actively.

In the case of either the first or the second approach, even if the watchdog timers both fail passively, operation of the apparatus is possible, and it is dangerous operation wherein the watchdog timers do not function.

However, there is the redemption that the probability of two continuously diagnosed watchdog timers both failing passively is extremely small, and that a warning display is provided.

An active failure is a failure in which the watchdog timer generates a reset signal when in fact it should not, and a passive failure is a failure in which the watchdog timer fails to generate a reset signal when in fact it should.

If the application is one wherein stopping the microprocessor is permitted, the apparatus can be made such that the microprocessor cannot restart after either one of the watchdog timers has failed.

And when the watchdog timers are both failing passively, in the following ways this can be detected and the microprocessor stopped and restarting of the microprocessor made impossible.

In the example shown in FIG. 1, when the first watchdog timer 120*a* is failing passively, the first error output ER1 is canceled and an operation diagnosis of the second watchdog timer 120*b* carried out, and if this is also failing passively it is deduced that both of the watchdog timers are failing passively and a second failure occurrence memory device (not shown) is set.

If the second watchdog timer 120*b* is normal, the first error output ER1 is generated and the first watchdog timer 120*a* is thereby cut off. This kind of special diagnosis can be executed at regular intervals to detect a dangerous state.

In the example shown in FIG. 7, when the first watchdog timer 120*a* is failing passively, an operation diagnosis of the second watchdog timer 120*b* is carried out straight away, and if this is also failing passively then it is deduced that both of the watchdog timers are failing passively and a second failure occurrence memory device (not shown) is set.

If a sleep power supply supplied from the first power supply line 110 connected directly to the power supply 1 is used for the second failure occurrence memory device so that it keeps its memory even when the power supply switch 2 is turned off, the microprocessor can be kept reset and prevented from restarting when the power supply is turned on again.

The warning/display device 5 can also show a message display indicating the source and degree of seriousness of any abnormality.

And similarly for the drive-stopping gate elements 106 and 506 controlling special electrical loads, a plurality of interlock signals corresponding to different causes of failure can be provided and used accordingly.

What is claimed is:

1. A microprocessor runaway monitoring control circuit, for a microprocessor which controls an electrical load and generates a first watchdog clearing signal and a second watchdog clearing signal for monitoring runaway of the microprocessor, comprising:

a first watchdog timer for receiving the first watchdog clearing signal and generating a first reset signal if this first watchdog clearing signal is abnormal;

a second watchdog timer for receiving the second watchdog clearing signal and generating a second reset signal if this second watchdog clearing signal is abnormal;

a logical connector circuit for resetting the microprocessor by outputting an effective resetting signal when the first and second reset signals are both generated; and failure diagnosing means for inputting the first and second reset signals respectively as first and second monitor signals to the microprocessor, wherein at different timing to each other, the microprocessor intentionally renders abnormal the first and second watchdog clearing signals and checks whichever of the first and second monitor signals corresponds to one of the first and second watchdog clearing signals intentionally rendered abnormal and thereby checks the operation of whichever of the first and second watchdog timers corresponding to one of the first and second watchdog clearing signals rendered abnormal.

2. A microprocessor runaway monitoring control circuit according to claim 1, wherein the microprocessor generates a first error signal when it determines that the first watchdog timer is abnormal and generates a second error signal when it determines that the second watchdog timer is abnormal, and the microprocessor has first and second failure response circuits, and in response to the first error signal the first failure response circuit forcibly renders reset-effective the reset signal of the first watchdog timer and in response to the second error signal the second failure response circuit forcibly renders reset-effective the reset signal of the second watchdog timer, and in either case, in response to one of the first and second reset signals from whichever of the first and second watchdog timers not forcibly reset the logical connector circuit generates an effective resetting signal and resets the microprocessor, so that even if one of the first and second watchdog timers is abnormally failing to generate its reset signal the effective resetting signal output can still be generated.

3. A microprocessor runaway monitoring control circuit according to claim 2, wherein the failure diagnosing means, to check the normal operation of one of the failure response circuits, causes one of the first and second error signals to be generated from the microprocessor and inputted to the respective failure response circuit, and the failure diagnosing means has first and second checking means, and the first checking means checks the response of the first monitor signal to the first error signal inputted to the first failure response circuit and the second checking means checks the response of the second monitor signal to the second error signal inputted to the second failure response circuit.

4. A microprocessor runaway monitoring control circuit according to claim 1, further comprising starting circuits for, when a power supply to the runaway monitoring control circuit is switched on, causing the effective resetting signal to be generated by forcibly rendering reset-effective for a predetermined time the reset signals of both the first and second watchdog timers, wherein the microprocessor is reset when the power supply is switched on even if one of the first and second watchdog timers is abnormal and not operating.

5. A microprocessor runaway monitoring control circuit according to claim 1, wherein the logical connector circuit is a multiplex logical connector circuit comprising a plurality of logical connector circuits connected in parallel.

6. A microprocessor runaway monitoring circuit according to claim 1, wherein the first and second watchdog timers are timers which generate respectively first and second reset signals of a predetermined time width.

7. A microprocessor runaway monitoring circuit according to claim 1, wherein the microprocessor generates an error signal when the failure diagnosing means determines that at least one of the first and second watchdog timers is abnormal, the runaway monitoring circuit further comprising failure occurrence storing means for storing the error signal and the effective resetting signal and then clearing the stored error signal and effective resetting signal and setting to a ready-to-store state when a power supply to the runaway monitoring circuit is turned on and reporting means for outputting at least one of the stored error signal and effective resetting signal as a report signal, the microprocessor being able to report based on this report signal.

8. A microprocessor runaway monitoring circuit according to claim 1, further comprising a sub-microprocessor which is subordinate to the microprocessor and shares overall control therewith, wherein the microprocessor comprises runaway monitoring means for the sub-microprocessor for monitoring a watchdog timer clearing signal generated by the sub-microprocessor and when there is an abnormality thereof supplying a reset signal to and thereby resetting the sub-microprocessor, and the effective resetting signal supplied from the first and second watchdog timers resets the microprocessor and the sub-microprocessor.

9. A microprocessor runaway monitoring control circuit according to claim 8, wherein the sub-microprocessor controls a different electrical load from the main microprocessor and power is supplied to the electrical loads controlled by the main microprocessor and the sub-microprocessor with a supply power source supplying power to the runaway monitoring control circuit as a load power supply, the runaway monitoring control circuit further comprising switching means for switching ON/OFF the connection between the load power supply and the electrical loads, the switching means being switched OFF when the supply power source is turned on and when the effective resetting signal is outputted and switched ON when the effective resetting signal output is canceled.

10. A microprocessor runaway monitoring control circuit according to claim 8, wherein the sub-microprocessor controls a different electrical load from the main microprocessor and the main microprocessor generates an error signal when the failure diagnosing means determines that at least one of the first and second watchdog timers is abnormal, the runaway monitoring circuit further comprising failure occurrence storing means, for storing the error signal and the effective resetting signal and then clearing the stored error signal and effective resetting signal and setting to a ready-to-store state when a power supply to the runaway monitoring circuit is turned on, and drive-stopping means, for stopping the output to at least one of the electrical loads controlled by the main microprocessor and the sub-microprocessor when the failure occurrence storing means stores the error signal and the effective resetting signal.

11. A microprocessor runaway monitoring circuit according to claim 1, further comprising switching means for, when a supply power source supplying power to the runaway monitoring control circuit is used as a load power supply and power is supplied to the electrical load from this load power supply, switching ON/OFF the connection between the load power supply and the electrical loads, wherein the switching means is switched OFF when the supply power source is turned on and when the effective resetting signal is outputted and the switching means is switched ON when the effective resetting signal output is canceled.

12. A microprocessor runaway monitoring control circuit according to claim 1, wherein the microprocessor generates an error signal when the failure diagnosing means determines that at least one of the first and second watchdog timers is abnormal, the runaway monitoring circuit further comprising failure occurrence storing means, for storing the error signal and the effective resetting signal and then clearing the stored error signal and effective resetting signal and setting to a ready-to-store state when a power supply to the runaway monitoring circuit is turned on, and drive-stopping means, for stopping the microprocessor output to at least one electrical load when the failure occurrence storing means stores the error signal and the effective resetting signal.

13. A microprocessor runaway monitoring control circuit, for a main microprocessor which controls an electrical load and generates a first watchdog clearing signal and a second watchdog clearing signal for runaway monitoring control of the main microprocessor, the microprocessor runaway monitoring control circuit comprising:

a sub-microprocessor, cooperating with the main microprocessor, which receives the second watchdog clearing signal from the main microprocessor and generates a third watchdog clearing signal;

a first watchdog timer for receiving the first watchdog clearing signal and generating a first reset signal if this first watchdog clearing signal is abnormal;

a second watchdog timer, incorporated in the sub-microprocessor, for receiving the second watchdog clearing signal and generating a second reset signal if this second watchdog clearing signal is abnormal;

runaway monitoring means, incorporated in the main microprocessor, for receiving the third watchdog clearing signal from the sub-microprocessor and resetting the sub-microprocessor by generating a third reset signal if this third watchdog clearing signal is abnormal;

a logical connector circuit for inferring abnormality of the main microprocessor and resetting the main microprocessor and the sub-microprocessor by outputting an effective resetting signal when the first and second reset signals are both generated; and failure diagnosing means, for inputting the first and second reset signals respectively as first and second monitor signals to the main microprocessor, wherein at different timing to each other, the main microprocessor intentionally renders abnormal the first and second watchdog clearing signals and checks whichever of the first and second monitor signals corresponds to one of the first and second watchdog clearing signals rendered abnormal and thereby checks the operation of whichever of the first and second watchdog timers corresponding to one of the first and second watchdog clearing signals intentionally rendered abnormal.

14. A microprocessor runaway monitoring control circuit according to claim 13, wherein the main microprocessor generates a first error signal when it determines that the first watchdog timer is abnormal and generates a second error signal when it determines that the second watchdog timer is abnormal, and the main microprocessor has first and second failure response circuits, and in response to the first error signal the first failure response circuit forcibly renders reset-effective the reset signal of the first watchdog timer and in response to the second error signal the second failure response circuit forcibly renders reset-effective the reset signal of the second watchdog timer, so that in response to the reset signal from the watchdog timer not forcibly reset the logical connector circuit generates an effective resetting signal and resets the main microprocessor and the sub-microprocessor and thus even if one of the first and second watchdog timers is abnormally failing to generate its reset signal the effective resetting signal output can still be generated.

15. A microprocessor runaway monitoring control circuit according to claim 14, wherein the failure diagnosing means, to check the normal operation of one of the failure response circuits, causes one of the first and second error signals to be generated from the microprocessor and inputted to the respective failure response circuit, and the failure diagnosing means has first and second checking means, and the first checking means checks the response of the first monitor signal to the first error signal inputted to the first failure response circuit and the second checking means checks the response of the second monitor signal to the second error signal inputted to the second failure response circuit.

16. A microprocessor runaway monitoring control circuit according to claim 13, further comprising starting circuits for, when a power supply to the runaway monitoring control circuit is switched on, causing the effective resetting signal to be generated by forcibly rendering reset-effective for a predetermined time the reset signals of both the first and second watchdog timers, wherein the main microprocessor and the sub-microprocessor are reset when the power supply is switched on even if one of the first and second watchdog timers is abnormal and not operating.

17. A microprocessor runaway monitoring control circuit according to claim 13, wherein the logical connector circuit is a multiplex logical connector circuit comprising a plurality of logical connector circuits connected in parallel.

18. A microprocessor runaway monitoring circuit according to claim 13, wherein the first and second watchdog timers are timers which generate respectively first and second reset signals of a predetermined time width.

19. A microprocessor runaway monitoring circuit according to claim 13, wherein the main microprocessor generates an error signal when the failure diagnosing means determines that at least one of the first and second watchdog timers is abnormal, the runaway monitoring circuit further comprising failure occurrence storing means for storing the error signal and the effective resetting signal and then clearing the stored error signal and effective resetting signal and setting to a ready-to-store state when a power supply to the runaway monitoring circuit is turned on and reporting means for outputting at least one of the stored error signal and effective resetting signal as a report signal, the microprocessor being able to report based on this report signal.

20. A microprocessor runaway monitoring control circuit according to claim 13, wherein the sub-microprocessor controls a different electrical load from the main microprocessor and power is supplied to the electrical loads controlled by the main microprocessor and the sub-microprocessor with a supply power source supplying power to the runaway monitoring control circuit as a load power supply, the runaway monitoring control circuit further comprising switching means for switching ON/OFF the connection between the load power supply and the electrical loads, the switching means being switched OFF when the supply power source is turned on and when the effective resetting signal is outputted and switched ON when the effective resetting signal output is canceled.

21. A microprocessor runaway monitoring control circuit according to claim 13, wherein the sub-microprocessor controls a different electrical load from the main microprocessor and the main microprocessor generates an error signal when the failure diagnosing means determines that at least one of the first and second-watchdog timers is abnormal, the runaway monitoring circuit further comprising failure occurrence storing means, for storing the error signal and the effective resetting signal and then clearing the stored error signal and effective resetting signal and setting to a ready-to-store state when a power supply to the runaway monitoring circuit is turned on, and drive-stopping means, for stopping the output to at least one of the electrical loads controlled by the main microprocessor and the sub-microprocessor when the failure occurrence storing means stores the error signal and the effective resetting signal.

22. A microprocessor runaway monitoring control circuit according to claim 13, wherein the failure diagnosing means inputs the state of the first reset signal to the main microprocessor as a first monitor signal and the main microprocessor checks the operation of the first watchdog timer by intentionally rendering abnormal the first watchdog clearing signal and checking the response of the first monitor signal, and failure diagnosis of the second watchdog timer is carried out by the runaway monitoring means.

23. A microprocessor runaway monitoring control circuit according to claim 22, wherein the sub-microprocessor receives supply of a test mode signal from the main microprocessor at the time of a test and includes forced outputting means which when the test mode signal is received forcibly generates the second reset signal and supplies it to the gate circuit, and the response of the second monitor signal to the second reset signal forcibly generated by the sub-microprocessor is checked to diagnose whether or not the second reset signal generated by the sub-microprocessor has reached the gate circuit.

24. A microprocessor runaway monitoring control circuit according to claim 13, further comprising a default circuit for, until the sub-microprocessor has started and is operating normally, making the second reset signal effective so that the effective resetting signal is generated in response to the first reset signal generated by the watchdog timer.

25. A microprocessor runaway monitoring control circuit, for a microprocessor which controls an electrical load and generates a first watchdog clearing signal and a second watchdog clearing signal for runaway monitoring control of the microprocessor and also generates a first test signal and a second test signal for testing, comprising:

a first watchdog timer, for receiving the first watchdog clearing signal from the microprocessor and generating a first reset signal if this first watchdog clearing signal is abnormal;

a second watchdog timer, for receiving the second watchdog clearing signal from the microprocessor and generating a second reset signal if this second watchdog clearing signal is abnormal;

a gate circuit, which receives the first test signal and the second test signal from the microprocessor and when receiving the first test signal stops the effective resetting signal output irrespective of the state of the first reset signal from the first watchdog timer and when receiving the second test signal stops the effective resetting signal output irrespective of the state of the second reset signal from the second watchdog timer and when receiving neither of the first and second test signals outputs the effective resetting signal in accordance with the states of the first and second reset signals; and failure diagnosing means for inputting the first and second reset signals to the microprocessor as first and second monitor signals, wherein at different timing to each other, the microprocessor generates the first test signal and the second test signal, and when generating the first test signal the microprocessor checks the operation of the first watchdog timer by intentionally rendering abnormal the first watchdog clearing signal inputted to the first watchdog timer and checking the output state of the first reset signal, and when generating the second test signal the microprocessor checks the operation of the second watchdog timer by intentionally rendering abnormal the second watchdog clearing signal inputted to the second watchdog timer and checking the output state of the second reset signal.

26. A microprocessor runaway monitoring circuit according to claim 25, further comprising:

means for continuing a test signal on the basis of a failure diagnosis result from the failure diagnosing means, which means for continuing a test signal causes the microprocessor to generate the first test signal continuously when determining that the first watchdog timer is abnormal and causes the microprocessor to generate the second test signal continuously when determining that the second watchdog timer is abnormal and so ensures that the effective reset signal is not generated as a result of abnormal operation of either of the first and second watchdog timers; and failure response means for forcibly resetting the microprocessor by outputting an effective resetting signal when the first and second test signals from the microprocessor are erroneously generated together.

27. A microprocessor runaway monitoring circuit according to claim 25, further comprising a starting circuit for generating an effective resetting signal when a power supply to the runaway monitoring circuit is turned on by forcibly rendering reset-effective for a predetermined time the reset signals of both of the first and second watchdog timers, wherein the microprocessor can be reset with the effective resetting signal even when both of the first and second watchdog timers are inoperative when the power supply is turned on.

28. A microprocessor runaway monitoring circuit according to claim 25, wherein the first and second watchdog timers are timers which generate respectively first and second reset signals of a predetermined time width.

29. A microprocessor runaway monitoring circuit according to claim 25, wherein the microprocessor generates an error signal when the failure diagnosing means determines that at least one of the first and second watchdog timers is abnormal, the runaway monitoring circuit further comprising failure occurrence storing means for storing the error signal and the effective resetting signal and then clearing the stored error signal and effective resetting signal and setting to a ready-to-store state when a power supply to the runaway monitoring circuit is turned on and reporting means for outputting at least one of the stored error signal and effective resetting signal as a report signal, the microprocessor being able to report based on this report signal.

30. A microprocessor runaway monitoring circuit according to claim 25, further comprising a sub-microprocessor which is subordinate to the microprocessor and shares overall control therewith, wherein the microprocessor comprises runaway monitoring means for the sub-microprocessor for monitoring a watchdog timer clearing signal generated by the sub-microprocessor and when there is an abnormality thereof supplying a reset signal to and thereby resetting the sub-microprocessor, and the effective resetting signal supplied from the first and second watchdog timers resets the microprocessor and the sub-microprocessor.

31. A microprocessor runaway monitoring control circuit according to claim 30, wherein the sub-microprocessor controls a different electrical load from the main microprocessor and power is supplied to the electrical loads controlled by the main microprocessor and the sub-microprocessor with a supply power source supplying power to the runaway monitoring control circuit as a load power supply, the runaway monitoring control circuit further comprising switching means for switching ON/OFF the connection between the load power supply and the electrical loads, the switching means being switched OFF when the supply power source is turned on and when the effective resetting signal is outputted and switched ON when the effective resetting signal output is canceled.

32. A microprocessor runaway monitoring control circuit according to claim 30, wherein the sub-microprocessor controls a different electrical load from the main microprocessor and the main microprocessor generates an error signal when the failure diagnosing means determines that at least one of the first and second watchdog timers is abnormal, the runaway monitoring circuit further comprising failure occurrence storing means, for storing the error signal and the effective resetting signal and then clearing the stored error signal and effective resetting signal and setting to a ready-to-store state when a power supply to the runaway monitoring circuit is turned on, and drive-stopping means, for stopping the output to at least one of the electrical loads controlled by the main microprocessor and the sub-microprocessor when the failure occurrence storing means stores the error signal and the effective resetting signal.

33. A microprocessor runaway monitoring circuit according to claim 25, further comprising switching means for, when a supply power source supplying power to the runaway monitoring control circuit is used as a load power supply and power is supplied to the electrical load from this load power supply, switching ON/OFF the connection between the load power supply and the electrical load, wherein the switching means is switched OFF when the supply power source is turned on and when the effective resetting signal is outputted and the switching means is switched ON when the effective resetting signal output is canceled.

34. A microprocessor runaway monitoring control circuit according to claim 25, wherein the microprocessor generates an error signal when the failure diagnosing means determines that at least one of the first and second watchdog timers is abnormal, the runaway monitoring circuit further comprising failure occurrence storing means, for storing the error signal and the effective resetting signal and then clearing the stored error signal and effective resetting signal and setting to a ready-to-store state when a power supply to the runaway monitoring circuit is turned on, and drive-stopping means, for stopping the microprocessor output to at least one electrical load when the failure occurrence storing means stores the error signal and the effective resetting signal.

35. A microprocessor runaway monitoring control circuit, for a main microprocessor which controls an electrical load and generates a first watchdog clearing signal and a second watchdog clearing signal for runaway monitoring control of the microprocessor and also generates a first test signal and a second test signal for testing, comprising:

a sub-microprocessor, cooperating with the main microprocessor, which generates a third watchdog clearing signal for runaway monitoring control of the sub-microprocessor;

a first watchdog timer, for receiving the first watchdog clearing signal from the main microprocessor and generating a first reset signal if this first watchdog clearing signal is abnormal;

a second watchdog timer, incorporated in the sub-microprocessor, for receiving the second watchdog clearing signal from the main microprocessor and generating a second reset signal if this second watchdog clearing signal is abnormal;

runaway monitoring means, incorporated in the main microprocessor, which receives the third watchdog clearing signal from the sub-microprocessor and resets the sub-microprocessor by generating a third reset signal when the third watchdog clearing signal is abnormal;

a gate circuit, which receives the first test signal and the second test signal from the main microprocessor and when receiving the first test signal stops the effective resetting signal output irrespective of the state of the first reset signal from the first watchdog timer and when receiving the second test signal stops the effective resetting signal output irrespective of the state of the second reset signal from the second watchdog timer and when receiving neither of the first and second test signals outputs the effective resetting signal and resets the main microprocessor and the sub-microprocessor in accordance with the states of the first and second reset signals; and failure diagnosing means for inputting the first and second reset signals to the main microprocessor as first and second monitor signals, wherein at different timing to each other, the main microprocessor generates the first test signal and the second test signal, and when generating the first test signal the main microprocessor checks the operation of the first watchdog timer by intentionally rendering abnormal the first watchdog clearing signal inputted to the first watchdog timer and checking the output state of the first reset signal, and when generating the second test signal the main microprocessor checks the operation of the second watchdog timer by intentionally rendering abnormal the second watchdog clearing signal inputted to the second watchdog timer and checking the output state of the second reset signal.

36. A microprocessor runaway monitoring circuit according to claim 35, further comprising:

means for continuing a test signal on the basis of a failure diagnosis result from the failure diagnosing means, which means for continuing a test signal causes the main microprocessor to generate the first test signal continuously when determining that the first watchdog timer is abnormal and causes the main microprocessor to generate the second test signal continuously when determining that the second watchdog timer is abnormal and so ensures that the effective reset signal is not generated as a result of abnormal operation of either of the first and second watchdog timers; and failure response means for forcibly resetting the main microprocessor and the sub-microprocessor by outputting an effective resetting signal when the first and second test signals from the main microprocessor are erroneously generated together.

37. A microprocessor runaway monitoring circuit according to claim 35, further comprising a starting circuit for generating an effective resetting signal when a power supply to the runaway monitoring circuit is turned on by forcibly rendering reset-effective for a predetermined time the reset signals of both of the first and second watchdog timers, wherein the main microprocessor and the sub-microprocessor can be reset with the effective resetting signal even when both of the first and second watchdog timers are inoperative when the power supply is turned on.

38. A microprocessor runaway monitoring circuit according to claim 35, wherein the first and second watchdog timers are timers which generate respectively first and second reset signals of a predetermined time width.

39. A microprocessor runaway monitoring circuit according to claim 35, wherein the main microprocessor generates an error signal when the failure diagnosing means determines that at least one of the first and second watchdog timers is abnormal, the runaway monitoring circuit further comprising failure occurrence storing means for storing the error signal and the effective resetting signal and then clearing the stored error signal and effective resetting signal and setting to a ready-to-store state when a power supply to the runaway monitoring circuit is turned on and reporting means for outputting at least one of the stored error signal and effective resetting signal as a report signal, the microprocessor being able to report based on this report signal.

40. A microprocessor runaway monitoring control circuit according to claim 35, wherein the sub-microprocessor controls a different electrical load from the main microprocessor and power is supplied to the electrical loads controlled by the main microprocessor and the sub-microprocessor with a supply power source supplying power to the runaway monitoring control circuit as a load power supply, the runaway monitoring control circuit further comprising switching means for switching ON/OFF the connection between the load power supply and the electrical loads, the switching means being switched OFF when the supply power source is turned on and when the effective resetting signal is outputted and switched ON when the effective resetting signal output is canceled.

41. A microprocessor runaway monitoring control circuit according to claim 35, wherein the sub-microprocessor controls a different electrical load from the main microprocessor and the main microprocessor generates an error signal when the failure diagnosing means determines that at least one of the first and second watchdog timers is abnormal, the runaway monitoring circuit further comprising failure occurrence storing means, for storing the error signal and the effective resetting signal and then clearing the stored error signal and effective resetting signal and setting to a ready-to-store state when a power supply to the runaway monitoring circuit is turned on, and drive-stopping means, for stopping the output to at least one of the electrical loads controlled by the main microprocessor and the sub-microprocessor when the failure occurrence storing means stores the error signal and the effective resetting signal.

42. A microprocessor runaway monitoring control circuit according to claim 35, wherein the failure diagnosing means inputs the state of the first reset signal to the main microprocessor as a first monitor signal and the main microprocessor checks the operation of the first watchdog timer by intentionally rendering abnormal the first watchdog clearing signal and checking the response of the first monitor signal, and failure diagnosis of the second watchdog timer is carried out by the runaway monitoring means.

43. A microprocessor runaway monitoring control circuit according to claim 42, wherein the sub-microprocessor receives supply of a test mode signal from the main microprocessor at the time of a test and includes forced outputting means which when the test mode signal is received forcibly generates the second reset signal and supplies it to the gate circuit, and the response of the second monitor signal to the second reset signal forcibly generated by the sub-microprocessor is checked to diagnose whether or not the second reset signal generated by the sub-microprocessor has reached the gate circuit.

44. A microprocessor runaway monitoring control circuit according to claim 35, further comprising a default circuit for, until the sub-microprocessor has started and is operating normally, making the second reset signal ineffective so that the effective resetting signal is generated in response to the first reset signal generated by the watchdog timer.

* * * * *